United States Patent
Rajamani et al.

(10) Patent No.: US 10,260,904 B2
(45) Date of Patent: Apr. 16, 2019

(54) POSITION SENSING SYSTEM

(71) Applicant: Regents of the University of Minnesota, Minneapolis, MN (US)

(72) Inventors: Rajesh Rajamani, St. Paul, MN (US); Saber Taghvaeeyan, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 410 days.

(21) Appl. No.: 14/778,491

(22) PCT Filed: Mar. 19, 2014

(86) PCT No.: PCT/US2014/031250
§ 371 (c)(1),
(2) Date: Sep. 18, 2015

(87) PCT Pub. No.: WO2014/153422
PCT Pub. Date: Sep. 25, 2014

(65) Prior Publication Data
US 2016/0282141 A1    Sep. 29, 2016

Related U.S. Application Data

(60) Provisional application No. 61/803,268, filed on Mar. 19, 2013.

(51) Int. Cl.
   *G01D 5/14*    (2006.01)
(52) U.S. Cl.
   CPC .............. *G01D 5/14* (2013.01); *G01D 5/145* (2013.01)
(58) Field of Classification Search
   CPC .................................. G01D 5/14; G01D 5/145

USPC ...... 324/207.11–207.25, 200, 234, 235, 238, 324/240, 256–258, 300, 310–317, 500,
(Continued)

(56) References Cited

U.S. PATENT DOCUMENTS

| | | |
|---|---|---|
| 4,422,041 A | 12/1983 | Lienau |
| 4,560,930 A | 12/1985 | Kouno |
| 4,810,965 A | 3/1989 | Fujiwara et al. |

(Continued)

FOREIGN PATENT DOCUMENTS

| | | |
|---|---|---|
| CA | 1208366 A | 7/1986 |
| CN | 101080610 A | 11/2007 |

(Continued)

OTHER PUBLICATIONS

International Search Report and Written Opinion re PCT/US2014/031250, dated Aug. 4, 2014 (10 pages).

(Continued)

*Primary Examiner* — Melissa J Koval
*Assistant Examiner* — Trung Nguyen
(74) *Attorney, Agent, or Firm* — Dicke, Billig & Czaja, PLLC

(57) ABSTRACT

A position sensing system for measuring a position of a moving object includes a first magnetic sensor configured to measure an intensity of a magnetic field produced by the moving object. The system includes a controller configured to estimate a position of the moving object based on a nonlinear model of the magnetic field produced by the moving object as a function of position around the moving object, and based on the measured intensity of the magnetic field produced by the moving object.

22 Claims, 26 Drawing Sheets

(58) Field of Classification Search
USPC ....... 324/520, 600, 633, 667, 674, 681, 707, 324/727
See application file for complete search history.

(56) References Cited

U.S. PATENT DOCUMENTS

| | | | |
|---|---|---|---|
| 5,589,769 | A | 12/1996 | Krahn |
| 6,097,183 | A | 8/2000 | Goetz et al. |
| 7,173,414 | B2 | 2/2007 | Ricks et al. |
| 9,360,345 | B2 | 6/2016 | Fox |
| 2004/0017186 | A1* | 1/2004 | Viola ............... G01D 5/145 324/207.2 |
| 2010/0045275 | A1 | 2/2010 | Frachon |
| 2013/0088219 | A1 | 4/2013 | Fox |
| 2013/0138264 | A1* | 5/2013 | Hoshizaki ......... G01C 21/165 701/1 |
| 2013/0341934 | A1* | 12/2013 | Kawanishi ............ B60L 8/00 290/1 A |
| 2014/0091196 | A1* | 4/2014 | Maas ................ B65D 19/38 248/550 |
| 2015/0377648 | A1* | 12/2015 | Sirohiwala ......... G01D 5/145 324/207.2 |

FOREIGN PATENT DOCUMENTS

| | | |
|---|---|---|
| EP | 0215454 A1 | 3/1987 |
| EP | 0215454 B1 | 1/1990 |
| EP | 1818651 A1 | 8/2007 |
| FR | 2909170 A1 | 5/2008 |
| JP | 2009222518 A | 10/2009 |
| WO | 2005047823 A1 | 5/2005 |

OTHER PUBLICATIONS

"Nature-Inspired Position Determination Using Inherent Magnetic Fields" by Saber Taghvaeeyan & Rajesh Rajamani, published in Technology, vol. 2, No. 2, Jun. 2014 by World Scientific Publishing Co./Imperial College Press (10 pages).

European Examination Report for EP Application No. 14726800.7 dated Sep. 17, 2018.

* cited by examiner

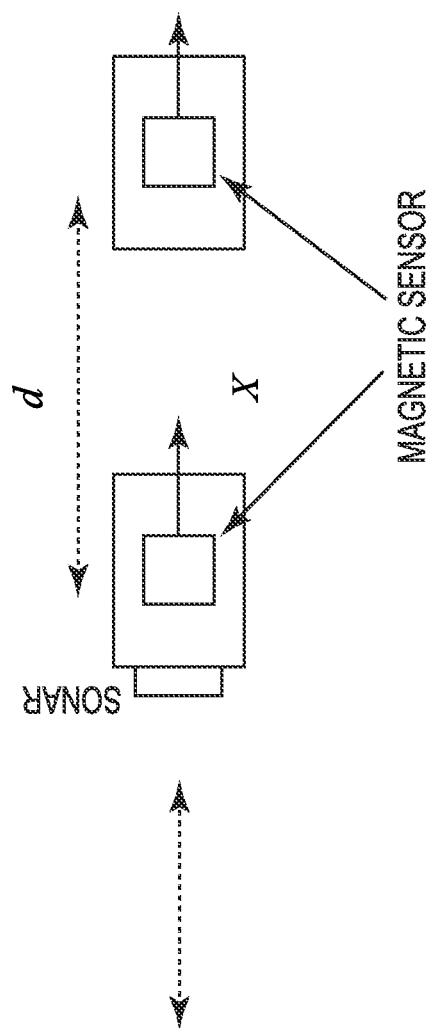
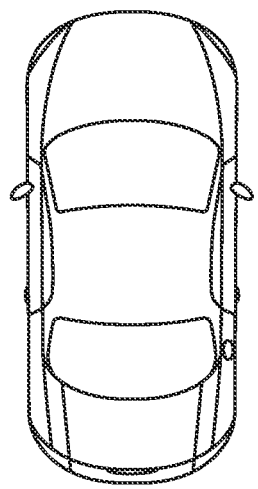
Fig. 19

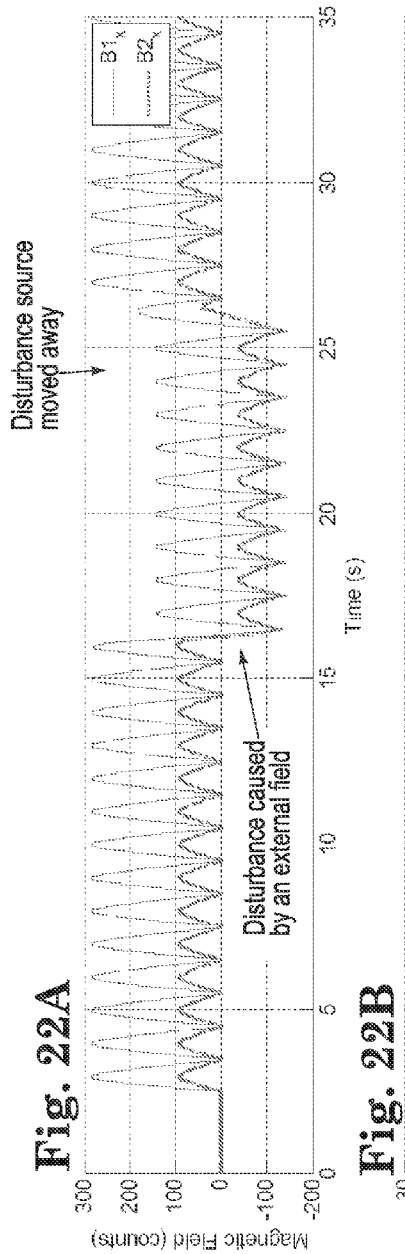
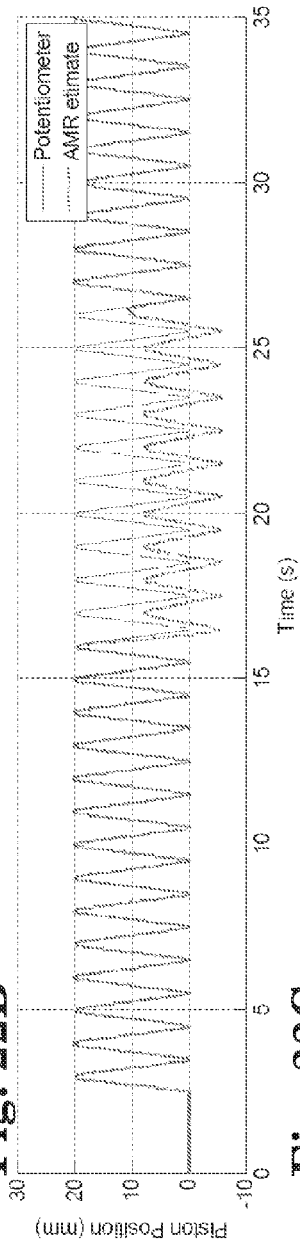
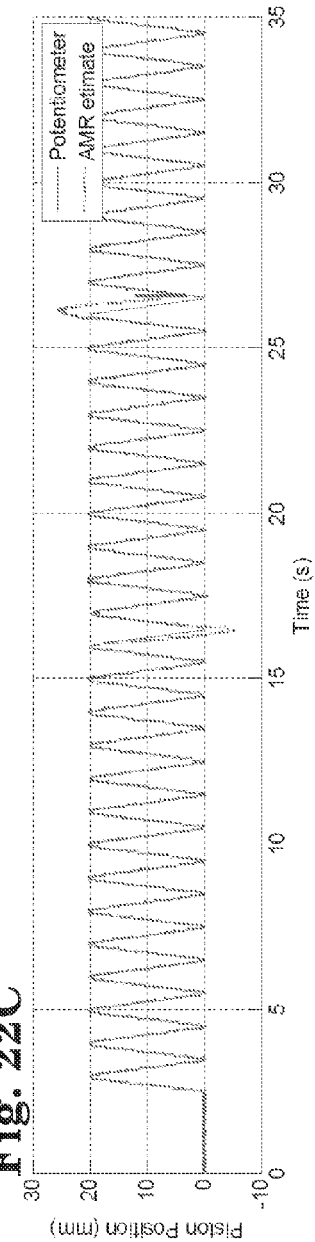

POSITION SENSING SYSTEM

CROSS-REFERENCE TO RELATED APPLICATIONS

This Utility Patent Application is a U.S. National Stage filing under 35. U.S.C. § 371 of PCT/2014/031250, filed Mar. 19, 2014, entitled "Position Sensing System"; which claims priority under 35 U.S.C. § 119(e)(1) to U.S. Provisional Patent Application Ser. No. 61/803,268, filed Mar. 19, 2013, entitled "Position Sensing System"; and the entire teachings of which are incorporated herein by reference.

REFERENCE TO GOVERNMENT RIGHTS

The Government has an interest in the patent as a result of funding derived from U.S. DOT/RITA Grant #DTRT06-G-0013.

BACKGROUND OF THE INVENTION

Potentiometers, linear variable differential transformers (LVDTs), lasers, and LED based systems may be used for position measurement. In general, the LVDT and potentiometer type of sensors require a mechanical connection between the moving object and the sensor. Hence, it is not possible to use these sensors in a case where the moving object is isolated, such as a piston moving inside an engine. Making the mechanical connection requires modification of the design of the system, requires assembly, and can expose the sensors to a harsh environment where their performance reduces. Another limitation of these types of sensors is that the size of the sensor increases as the range of measurement increases.

Laser and LED sensors do not require mechanical connection. However, they require a clear line of sight to the moving object. Hence, their application becomes limited in cases where the moving object is optically isolated. Another requirement of the sensor is that the surface of the moving object should reflect a certain percentage of the laser beam. Laser and LEDs that provide sub-mm level accuracy are highly expensive.

Some position measurement systems that are based on magnetic fields only provide a binary measurement of position (e.g., an indication of whether the object is to the left or the right of the sensor), and do not provide a continuous measurement of position. Some position measurement systems that are based on magnetic fields require installation of an extra magnet on the moving object, and an array of magnetic sensor devices is placed adjacent to the moving object. In such a system, the required short gap (i.e., 0.5 mm to 5.5 mm) between the sensor and the moving object limits the applicability of the sensor in cases where a thicker isolation of the moving object is required. Another major drawback of such a system is that the size of the sensor increases with the increase in the range of measurement of the sensor. For example, if it is desired to measure the position of a hydraulic piston whose range of motion is 500 mm, the length of the sensor should be at least 500 mm. In some systems, the size of the magnets attached to the moving object are different based on the desired range of motion, and can be as large as 20 mm in diameter and 7 mm in thickness, limiting the placement of magnets in a moving piston in an engine or a hydraulic cylinder. Some of these systems also have poor linearity. The accuracy of magnetic sensors can be adversely affected by external magnetic objects coming close to the sensors.

SUMMARY OF THE INVENTION

One embodiment is directed to a position sensing system for measuring a position of a moving object. The system includes a first magnetic sensor configured to measure an intensity of a magnetic field produced by the moving object. The system includes a controller configured to estimate position of the moving object based on a nonlinear model of the magnetic field produced by the moving object as a function of position around the moving object, and based on the measured intensity of the magnetic field produced by the moving object.

BRIEF DESCRIPTION OF THE DRAWINGS

FIG. 19 shows a general schematic for testing vehicles in order to investigate the magnetic field generated by an encountered vehicle as a function of distance.

FIG. 22A shows a graph of magnetic field versus time when a disturbance in the magnetic field occurs.

FIG. 22B shows a graph of piston position versus time to show how existing techniques do not adjust for the disturbance in the magnetic field.

FIG. 22C shows a graph of piston position versus time to show how embodiments disclosed herein adjust for the disturbance in the magnetic field.

DETAILED DESCRIPTION OF THE INVENTION

I. Introduction

Figure 1:
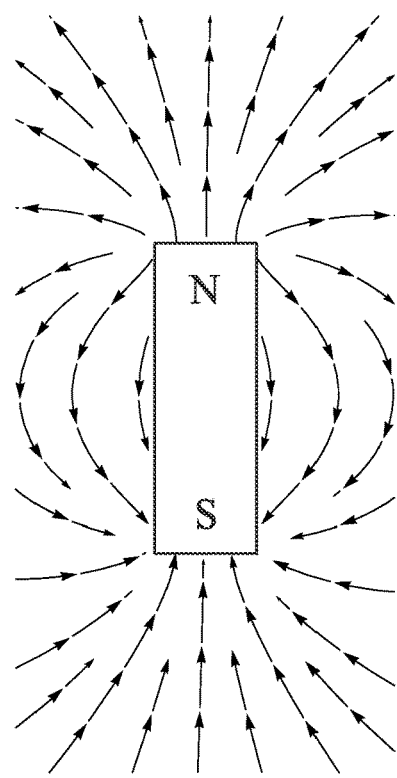
FIG. 1 shows an example of magnetic field lines around a long slender magnetized ferromagnetic object with a rectangular cross-section.

One embodiment is directed to a position sensing system and method for the non-intrusive real-time measurement of the position of a moving ferromagnetic object, such as piston position inside a cylinder. The system includes at least one magnetic sensor for measuring an intensity of a magnetic field produced by the moving object, and a processor or controller for estimating the position of the moving object based on a nonlinear model of the magnetic field produced by the object as a function of position around the object, and based on the measured intensity of the magnetic field produced by the object. With the use of more than one magnetic sensor, the parameters of the magnetic field function can be auto-calibrated or adaptively estimated.

The system according to one embodiment exploits the principle that any ferromagnetic object has an inherent magnetic field that varies as a function of position around the object. For example, cars on highways, pistons and other oscillating components in engines, pneumatic cylinders, hydraulic systems and many other moving components in machines have magnetic fields around them. By modeling the magnetic field as a function of position and using sensors to measure magnetic field intensity, the position of the object can be estimated. In one embodiment, the magnetic sensor or sensors are positioned axially along the direction of displacement. In this embodiment, the sensor or sensors are aligned with the axis of movement and sense one-dimensional position along the axis of movement. This principle is used to measure piston position in a free piston engine without requiring any sensors inside the engine cylinder. The piston is approximated as a rectangular metallic object and the variation of the magnetic field around it is modeled.

The variation of the magnetic field as a function of position is fundamentally nonlinear. A linear approximation consisting of a linear relationship between position and magnetic field will fail to be accurate, except over very short distances and short ranges. Hence, the assumption of a linear approximation without detailed modeling of magnetic field is inadequate. The use of a nonlinear model that fundamentally describes magnetic field variation with position for a ferromagnetic object of the given shape is needed for each shape.

A challenge arises from the fact that the parameters of the model would vary from one piston to another piston and would be cumbersome to calibrate for each piston. This challenge is addressed in one embodiment by utilizing two magnetic field sensors with known longitudinal separation between them. A number of estimation methods are disclosed that identify and update magnetic field parameters in real-time without requiring any additional position sensors for calibration. One such method is an iterated least squares algorithm that provides adaptive parameter estimates and accurate position estimation. Experimental results from a free piston engine set up show that the sensor can provide better than 0.4 mm accuracy in position estimates.

The same measurement system can be applied to machines that have no inherent magnetic fields by embedding a piston in such a system with a small magnet. An experimental demonstration of such a system on a pneumatic cylinder has been performed. The sensing system can be utilized for piston position measurement in multi-cylinder spark ignition (SI) and diesel engines, hydraulic cylinders, pneumatic cylinders, and in many other machines for position measurement applications.

Figure 2:
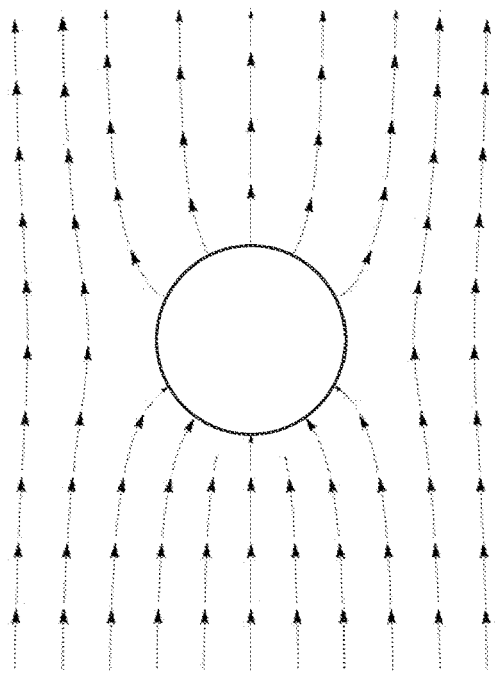
FIG. 2 shows an example of a ferromagnetic sphere object magnetized in a uniform magnetic field and the magnetic field lines around it.

FIG. 1 shows an example of magnetic field lines around a long slender magnetized ferromagnetic object with a rectangular cross-section. FIG. 2 shows an example of magnetic field lines around a ferromagnetic spherical object getting magnetized in a uniform magnetic field. The intensity of the magnetic field shown in these Figures varies as a function of position around the objects.

Figure 3:
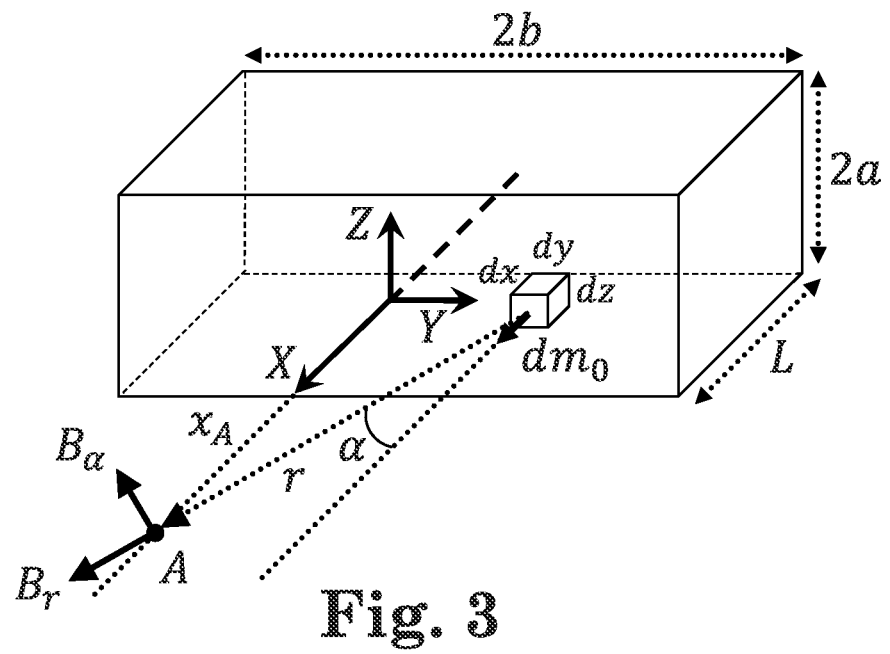
FIG. 3 shows a model of the magnetic field around a rectangular ferromagnetic object.

FIG. 3 shows a model of the magnetic field around a rectangular ferromagnetic object. The magnetic field around a ferromagnetic object can be modeled as a function of the geometry of the object, if it is assumed that the object is uniformly magnetized. For example, consider a rectangular metallic object as shown in FIG. 3. The magnetic field variation along the x-axis can be approximately modeled using the following Equation I:

$$B_x \cong \frac{p}{x_A + e} \quad \text{Equation I}$$

where: p and e are constant parameters and $x_A$ is the distance along the x-axis from the object.

Figure 4:
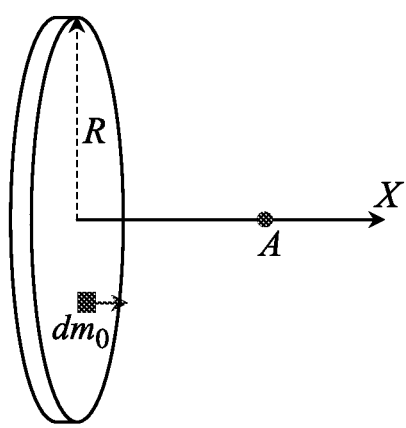
FIG. 4 shows a model of the magnetic field around a ferromagnetic object shaped like a circular disk.

FIG. 4 shows a model of the magnetic field around a ferromagnetic object shaped like a circular disk. The magnetic field around a circular disk, as shown in FIG. 4, can be modeled using the following Equation II:

$$B_x = p \frac{R^2}{(x_A^2 + R^2)^{3/2}} \quad \text{Equation II}$$

where: p is a constant parameter and R is the disk diameter.

Figure 5:
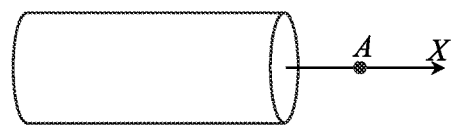
FIG. 5 shows a model of the magnetic field along the longitudinal axis of a long cylindrical ferromagnetic object.

FIG. 5 shows a model of the magnetic field along the longitudinal axis of a long cylindrical ferromagnetic object. The magnetic field along the longitudinal axis of a long cylinder (like the piston in an internal combustion engine), as shown in FIG. 5, can be modeled using the following Equation III:

$$B_x = p\left(1 - \frac{x_A}{(x_A^2 + R^2)^{1/2}}\right) \quad \text{Equation III}$$

where: $x_A$ is the distance of point A from center of the disk, R is the radius of the disk, and p is a constant parameter.

For the case where the diameter of the cylinder is small compared to the distance along the longitudinal axis at which measurements are being made, the magnetic field of Equation III can be approximated by:

$$B_x = p\left(1 - \frac{x_A}{(x_A^2 + R^2)^{\frac{1}{2}}}\right) =$$

$$p\left(1 - \frac{1}{\left(1 + \left(\frac{R}{x_A}\right)^2\right)^{\frac{1}{2}}}\right) = p\left(1 - \left(1 - \frac{1}{2}\left(\frac{R}{x_A}\right)^2\right)\right) = \frac{p'}{x_A^2}$$

where:

$$p' = \frac{pR^2}{2}$$

As seen from this equation, the magnetic field variation is inversely proportional to the square of the distance. Earlier, for the other shapes described in Equations I and II, the variation was inversely proportional to other powers of the distance. Thus, the magnetic field variation as a function of distance depends on the shape of the ferromagnetic object.

Figure 6:
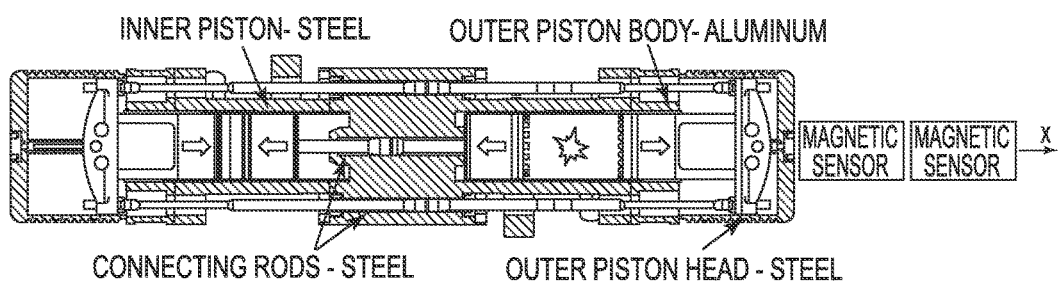
FIG. 6 shows the use of the inherent magnetic field of a free piston engine for position estimation.

By measuring the magnetic field at one or more points in the neighborhood of the ferromagnetic object, and by using the model of the magnetic field as a function of position, the position of the object can be calculated very reliably with sub-mm precision. For example, consider one or more magnetic sensors located near the cylinder head of a free-piston engine as shown in FIG. 6. FIG. 6 shows the use of the inherent magnetic field of a free piston engine for position estimation. By measuring the magnetic field, $B_x$, using the model given by Equation I, and by knowing the model parameters p and e, one can compute the piston position inside the cylinder.

While the magnetic field function can be obtained from analytical modeling, the parameters in the model vary from one object to another, even for objects with the same geometry. However, in one embodiment, these parameters are pre-calibrated or obtained by adaptive estimation algorithms for auto-calibration, using redundant magnetic field measurements. These parameters depend on both the size and strength of magnetization of the specific object and cannot be known a priori. In order for the sensor to be useful, it is desirable to be able to measure position without requiring cumbersome calibration for each object. This can be done by using just one additional redundant sensor for a one-dimensional position measurement application.

One embodiment consists of the following components: (1) A set of magnetic field measurement sensors, longitudinally or laterally separated with known distances between them; (2) a model of the magnetic field around the ferromagnetic object under consideration, as a function of the position around the object; (3) a method to calculate the position of the object based on measurements of the magnetic field, and based on the magnetic field as a function of position from the model; and (4) a method to adaptively estimate the parameters of the model by use of multiple longitudinally/laterally separated redundant sensors.

Figure 7:
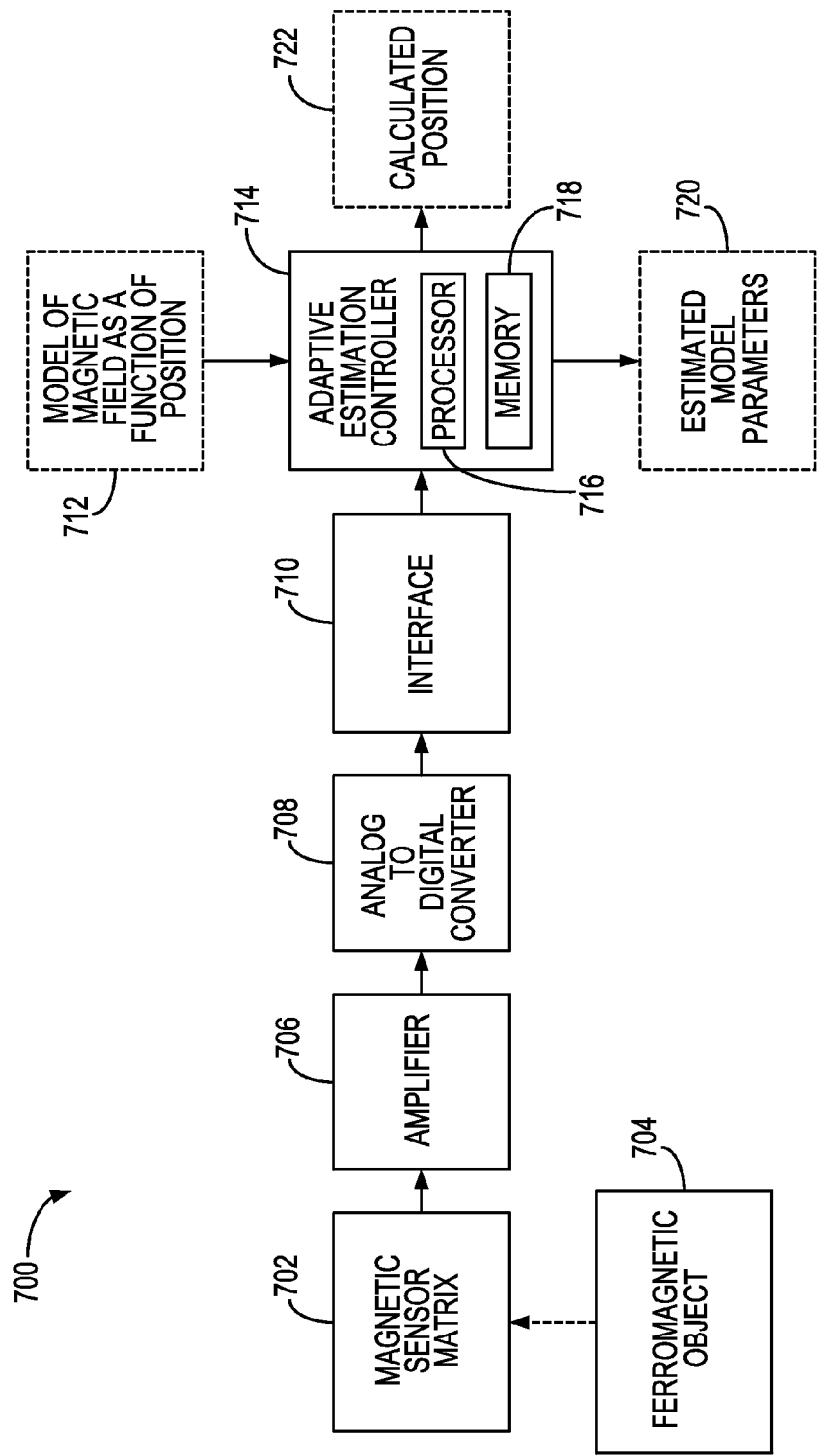
FIG. 7 is a block diagram illustrating a position measurement system according to one embodiment.

FIG. 7 is a block diagram illustrating a position measurement or sensing system 700 according to one embodiment. System 700 includes a matrix of magnetic sensors with known distances between the sensors 702, amplifier 706, analog to digital converter 708, interface 710, adaptive estimation controller 714, and a model of magnetic field as a function of position 712. System 700 is configured to measure the position of ferromagnetic object 704 as the object 704 moves.

In operation according to one embodiment, the matrix of magnetic sensors 702 continuously measures the magnetic field intensity at the location of the matrix 702. The measured magnetic field intensity varies as the object 704 moves. In one embodiment, the matrix 702 includes one or more magnetic field sensors in a known configuration. Magnetic sensor matrix 702 generates analog measurements based on the sensed magnetic field intensity, and outputs the analog measurements to amplifier 706, which amplifies the analog measurements. Amplifier 706 outputs the amplified analog measurements to analog to digital converter 708, which converts the amplified analog measurements to digital measurement data. Converter 708 outputs the digital measurement data to controller 714 via interface 710. In one embodiment, interface 710 is a wireless interface. In another embodiment, interface 710 is a wired interface.

[81] Based on the received digital measurement data and the model 712, controller 714 performs an adaptive estimation method to calculate estimated model parameters 720. Using the calculated parameters 720 in the model 712, controller 714 continuously generates calculated position data 722 based on received digital measurement data. The calculated position data 722 provides a real-time indication of the current position of the object 704. In one embodiment, after calculating the estimated model parameters 720, controller 714 is also configured to periodically update these parameters 720 during normal sensing operations of the system 700.

In one embodiment, controller 714 comprises a computing system or computing device that includes at least one processor 716 and memory 718. Depending on the exact configuration and type of computing device, the memory 718 may be volatile (such as RAM), non-volatile (such as ROM, flash memory, etc.), or some combination of the two. The memory 718 used by controller 714 is an example of computer storage media (e.g., non-transitory computer-readable storage media storing computer-executable instructions for performing a method). Computer storage media used by controller 714 according to one embodiment includes volatile and nonvolatile, removable and non-removable media implemented in any suitable method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired information and that can be accessed by controller 714.

II. Measuring Position Based on Magnetic Fields

The inherent magnetic field of a metallic object can be used to compute the position of the object. Any ferromagnetic object has an inherent magnetic field and this field varies as a function of the position around the object. If the magnetic field can be analytically obtained as a function of the position, the field intensity can be measured using sensors and then the position of the object computed from it. Embodiments disclosed herein are directed to the modeling of the magnetic field around a metallic object as a function of position and the use of this model to estimate position from magnetic field measurements.

A significant challenge for this sensing mechanism arises from the fact that the parameters in the magnetic field versus position function are unique to the particular object under consideration. While the functional form will remain the same for objects of the same shape and size, the parameters in the function can vary from one object to another due to the varying strength of magnetization.

Hence calibration of each individual object is needed which could be extremely time consuming both for instrumentation of the system with reference position calibration sensors, and for the actual data gathering and calibration process. Embodiments disclosed herein overcome this challenge by using an adaptive estimation algorithm that utilizes redundant magnetic sensors to both estimate parameters and the position.

In modern internal combustion engines with variable compression ratio, measuring the position of a piston inside the engine cylinder is becoming important for a variety of real-time combustion control technologies. This disclosure describes how the measurement system can be used for accurate estimation of the piston positions inside a free-piston engine. The same technology can be extended to many other oscillating piston applications, including conventional engine systems and electrohydraulic cylinders. In these applications, the piston position is estimated using a small external magnetic sensor located outside the cylinder. No instrumentation or assembly of sensors inside the cylinder is needed. Further, the sensor hardware is inexpensive with each magnetic sensor having a current retail cost of less than $10.

III. Free Piston Engine

A free piston engine (FPE) is one that does not have a crankshaft attached as in conventional engines. This "frees" the piston motion from being restricted by the position of the rotating crankshaft. The position of the piston instead is determined by the interaction between the combustion gas forces and the load forces acting on it. Advantages of a free piston engine include reductions in friction losses and possibilities to optimize engine operation efficiency using variable compression ratios. A free piston engine can have variable stroke length and the piston position needs to be controlled actively. This requires a precise position sensor for real-time feedback.

FIG. 6 shows a schematic of a dual piston FPE. The FPE includes an inner and an outer piston that can move towards and away from each other. Accurate estimation of the positions of the pistons is needed for synchronizing and controlling the piston motion. Currently, LVDT position sensors are used to measure piston positions. The LVDT sensors are expensive and furthermore require significant effort for assembly into the engine. LVDT sensors were utilized as described herein to verify the validity of the piston estimates obtained from the magnetic sensors.

One or more magnetic sensors are placed on one side of the FPE as shown in FIG. 6 to estimate the position of the outer piston. These magnetic sensors correspond to the matrix of magnetic sensors 702 in FIG. 7. The 3-axis HMC2003 set of anisotropic magneto-resistive (AMR) devices from Honeywell are utilized in one embodiment of the matrix of magnetic sensors 702. However, only the magnetic field readings along the "x" axis are measured and used for position estimation in one embodiment. Hence, in one form of this embodiment, a single axis AMR chip may be used for the magnetic sensor matrix 702.

In one embodiment, the AMR sensor is packaged on a Printed Circuit Board (PCB) together with a microprocessor that reads the sensor signals and transmits the values to a computer (e.g., to controller 714). A transceiver that can communicate wirelessly with a PC is included on the PCB. A USB interface instead of wireless transceiver can be utilized in order to obtain a 2 kHz sampling frequency. The transceiver or USB interface correspond to interface 710 in FIG. 7.

Very small changes in the magnetic field were observed as the piston was moved during preliminary tests. The change was of the order of 0.2 Gauss during full motion of the outer piston, from 20 mm to 60 mm away the AMR sensor. To get a better signal-to-noise-ratio the signals from the AMR sensors were amplified (e.g., by an amplifier 706, as shown in FIG. 7). The HMC2003 sensors have a nominal sensitivity of 1 V/G and since the sensor signals are being captured with a 12-bit analog-to-digital converter (i.e., converter 708 in FIG. 7) with a voltage range of 0-5 V, one count is equivalent to (5/4095) V=1.22 mV≅1.22 mG. On the other hand, the specified resolution of the AMR sensor according to the manufacturer is 40 µG. Hence, it is appropriate to amplify the output of the sensor by about 5 times to get higher signal levels without a significant deterioration in the signal-to-noise ratio. The Analog Devices AMP04 amplifier chip is utilized for amplifier 706 in one embodiment.

The main source of the generated magnetic field is considered to be the outer piston connecting mechanism, made of steel, since the body and the rest of the outer piston is made of aluminum. Also the inner piston is far away from the outer piston connecting rod, ~170 mm at the closest distance, and its effect on the magnet field at the AMR sensor is considered to be negligible. In the following section, an analytical relation between the magnetic field created by the piston connecting mechanism and the distance from it is developed.

IV. Analytical Development of Magnetic Field Equations

The outer piston connecting mechanism has a complex shape, and it is difficult to obtain an exact analytical formula for its magnetic field. However, if the shape is approximated with a rectangular cube as shown in FIG. 3, an approximate analytical equation for the magnetic field as a function of position along the longitudinal axis X of the piston head can be obtained.

The planar components of the magnetic field generated by the element $dm_0$ at the point A in FIG. 3 are given by the following Equations IV and V:

$$B_r = \frac{\mu_0 dm_0}{2\pi r^3} \cos\alpha \quad \text{Equation IV}$$

$$B_\alpha = \frac{\mu_0 dm_0}{4\pi r^3} \sin\alpha \quad \text{Equation V}$$

Hence, the magnetic field generated by $dm_0$ along the X axis would be equal to that given in the following Equations VI and VII:

$$B_x = B_r \cos\alpha - B_\alpha \sin\alpha \quad \text{Equation VI}$$

$$B_x = \frac{\mu_0 dm_0}{4\pi r^3}(2\cos^2\alpha - \sin^2\alpha) \quad \text{Equation VII}$$

The magnetic field generated by the whole block can be obtained from the integral given in the following Equation VIII:

$$B_x = \int_{-a}^{a}\int_{-b}^{b}\int_{-L}^{0} \frac{\mu_0 m_0}{4\pi r^3}(2\cos^2\alpha - \sin^2\alpha) dx dy dz \quad \text{Equation VIII}$$

Assuming that point A is at distance $x_A$ from the surface, we can express r and $\alpha$ in terms of x, $x_A$, y and z to obtain the following Equations IX, X, XI, and XII:

$$r^2 = y^2 + z^2 + (x_A - x)^2 \quad \text{Equation IX}$$

$$\alpha = \text{atan}\left(\frac{y}{|y|}\frac{\sqrt{y^2 + z^2}}{x_A - x}\right) \quad \text{Equation X}$$

$$\sin^2\alpha = \frac{y^2 + z^2}{y^2 + z^2 + (x_A - x)^2} \quad \text{Equation XI}$$

$$\cos^2\alpha = \frac{(x_A - x)^2}{y^2 + z^2 + (x_A - x)^2} \quad \text{Equation XII}$$

Hence, the integral in Equation VIII becomes:

$$B_x = \frac{\mu_0 m_0}{\pi}\int_0^a \int_0^b \int_{-L}^0 \frac{2(x_A - x)^2 - (y^2 + z^2)}{((x_A - x)^2 + y^2 + z^2)^{\frac{5}{2}}} dx dy dz \quad \text{Equation XIII}$$

Using MATLAB and the "int" command in the Symbolic toolbox, the result of the above integration will be:

$$B_x = \frac{\mu_0 m_0}{\pi}\left(\text{atan}\left(\frac{ab}{x_A(a^2 + b^2 + x_A^2)^{1/2}}\right) - \text{atan}\left(\frac{ab}{(x_A + L)(a^2 + b^2 + (x_A + L)^2)^{1/2}}\right)\right) \quad \text{Equation XIV}$$

Equation XIV can be simplified in order to use it efficiently for position estimation. The dimensions of the head are as follows: $a \cong 35$ mm, $b \cong 80$ mm, $L \cong 40$ mm.

The values of $x_A$ change from about 20 mm to 60 mm from the AMR sensor. First of all, the second term can be ignored in comparison with the first term since $(x_A+L)$ is in the denominator. The connecting rods add to the effective length L and decrease the effect of the second term. Hence, Equation XIV can be simplified to the following Equation XV:

$$B_x \cong \frac{\mu_0 m_0}{\pi}\text{atan}\left(\frac{ab}{x_A(a^2 + b^2 + x_A^2)^{1/2}}\right) \quad \text{Equation XV}$$

Also, the following approximation can be used since b is considerably larger than a and $x_A$:

$$\frac{ab}{x_A(a^2 + b^2 + x_A^2)^{1/2}} = \frac{a}{x_A\left(\left(\frac{a}{b}\right)^2 + 1 + \left(\frac{x_A}{b}\right)^2\right)^{1/2}} \cong \frac{a}{x_A} \quad \text{Equation XVI}$$

Hence, Equation XV can be simplified to the following:

$$B_x \cong \frac{\mu_0 m_0}{\pi}\text{atan}\left(\frac{a}{x_A}\right) \quad \text{Equation XVII}$$

Finally, using the approximation for the a tan function given in the following Equation XVIII, the approximation given in Equation XVII can be rewritten as shown in Equation XIX:

$$\theta = \text{atan}(z) \rightarrow \theta = \frac{\pi}{4} - \frac{\pi}{4}\frac{1-z}{1+z} \quad \text{Equation XVIII}$$

$$B_x \cong \frac{\mu_0 m_0}{\pi}\left(\frac{\pi}{4} - \frac{\pi}{4}\frac{1 - \frac{a}{x_A}}{1 + \frac{a}{x_A}}\right) = \frac{\mu_0 m_0}{4}\left(1 - \frac{x_A - a}{x_A + a}\right) = \frac{\mu_0 m_0 a}{2}\frac{1}{x_A + a} \quad \text{Equation XIX}$$

To apply Equation XIX to the piston head, we replace a with e since the effective height of the head is less than a defined as the width of the rectangle enclosing the head. Now defining $$p = \frac{\mu_0 m_0 a}{2}$$

we come up with the following Equation XX:

$$B_x \cong \frac{p}{x_A + e} \qquad \text{Equation XX}$$

Equation XX provides a simple relation for magnetic field at a distance $x_A$ from the piston head. By placing magnetic sensors at a distance from the piston head and using this relation, the outer piston position $x_p$, distance from the AMR sensor can be estimated. However, since the static magnetic field at the beginning of each test is being subtracted, which also includes the field created by the outer piston at its initial position, Equation XX is rewritten as follows:

$$B_x = \frac{p}{x_p + e} - \frac{p}{x_{p0} + e} \qquad \text{Equation XXI}$$

Subtracting the initial magnetic field is done in order to remove the influence of the earth's magnetic field and other static or slowly varying magnetic fields. In order to use Equation XXI for position estimation, three parameters p, e, and $x_0$, should be known. However, it is not possible to estimate these three parameters from Equation XXI, even if two AMR sensors are used instead of one AMR sensor, since the system becomes unobservable for three unknown parameters. Therefore, it is assumed that $x_{p0}$ is known. The value can be obtained from an LVDT. In case that there are no LVDTs installed, the piston can be started from a known initial position (e.g., at the lower or upper bounds of motion of the piston) for the first time, and $x_{p0}$ can be obtained from the geometry of the piston and the location of the AMR sensor with respect to the engine. After the first run, the final position is recorded and used as the initial position for the next run.

In the following sections, the values for p and e are estimated using two different strategies: (1) using one AMR sensor and an LVDT sensor (methods 1 and 2); and (2) using two AMR sensors (method 3). The results are discussed in the following sections.

V. Parameter Estimation for Position Measurement System Using Additional LVDT Sensor Since the FPE in one embodiment is already equipped with an LVDT, the distance obtained from the LVDT and the magnetic field measurements from the AMR sensor can be used to obtain estimates of the equation parameters. Therefore, the outer piston was moved from one end to the other end and the AMR sensor and LVDT sensor signals were captured.

Figure 8:
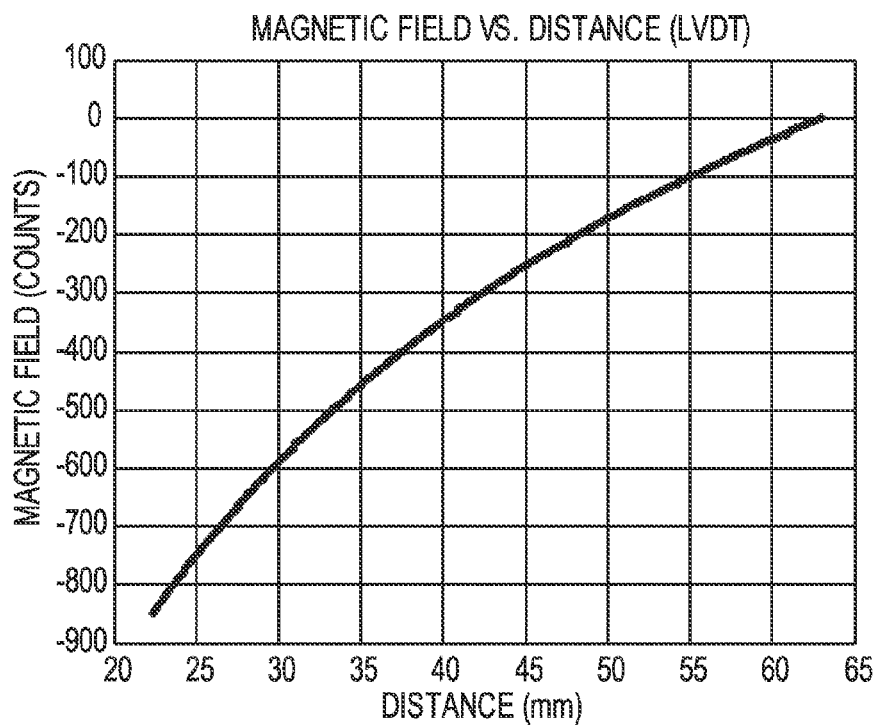
FIG. 8 shows the magnetic field obtained from a magnetic sensor versus distance obtained from an LVDT sensor as a piston was moved.

FIG. 8 shows the magnetic field obtained from the AMR sensor versus distance obtained from the LVDT sensor as the piston was moved from $x_{p0} \cong 63$ mm to $x_{pf} \cong 23$ mm. Magnetic field is plotted in arbitrary voltage units, the same as what was read from the ADC of the microcontroller.

Two methods were evaluated to estimate equation parameters, which are described in the following sub-sections.

A. Method 1—Least Squares

Defining $$q = \frac{p}{x_0 + e},$$

Equation XXI can be rewritten as follows:

$$B_{xi} = \frac{q(x_{p0} + e)}{x_{pi} + e} - q \Rightarrow (B_{xi} + q)(x_{pi} + e) = \qquad \text{Equation XXII}$$

$$q(x_{p0} + e) \Rightarrow B_{xi} x_{pi} = -B_{xi} e - (x_{pi} - x_{p0})q$$

All of the measurements from AMR sensor $B_{xi}$'s and LVDT sensor $x_{pi\text{-}LVDT}$'s are combined, and a Least Squares (LS) method is used to fit a curve to the data points, as shown in the following Equations XXIII-XXVI:

$$y = H\hat{X} + v \qquad \text{Equation XXIII}$$

$$y = [B_{x1} x_{p1\text{-}LVDT} \; B_{x2} x_{p2\text{-}LVDT} \; \ldots \; B_{x1} x_{pn\text{-}LVDT}]' \qquad \text{Equation XXIV}$$

$$H = \begin{bmatrix} -B_{x1} & -(x_{p1\text{-}LVDT} - x_{p0\text{-}LVDT}) \\ -B_{x2} & -(x_{p2\text{-}LVDT} - x_{p0\text{-}LVDT}) \\ \vdots & \vdots \\ -B_{xn} & -(x_{pn\text{-}LVDT} - x_{p0\text{-}LVDT}) \end{bmatrix} \qquad \text{Equation XXV}$$

$$\hat{X} = [\hat{e} \; \hat{q}]' \; \& \; \hat{p} = \hat{q}(x_{p0\text{-}LVDT} + \hat{e}) \qquad \text{Equation XXVI}$$

The least squares solution is given in the following Equation XXVII:

$$\hat{X} = (H'H)^{-1} H' y \qquad \text{Equation XXVII}$$

The estimated values of p and e are shown in the following Table I (Method 1):

TABLE I

TABLE I. Summary of Parameter Values and Maximum Errors

| Method | p | e | Max Error (mm) |
|---|---|---|---|
| Method 1 - Least Squares | −84043 | 24.0543 | 0.3294 |
| Method 2 - Minimax | −88233 | 25.6632 | 0.2731 |
| Method 3 - AMRs only | −85844 | 24.3881 | 0.4141 |

Figure 9A:
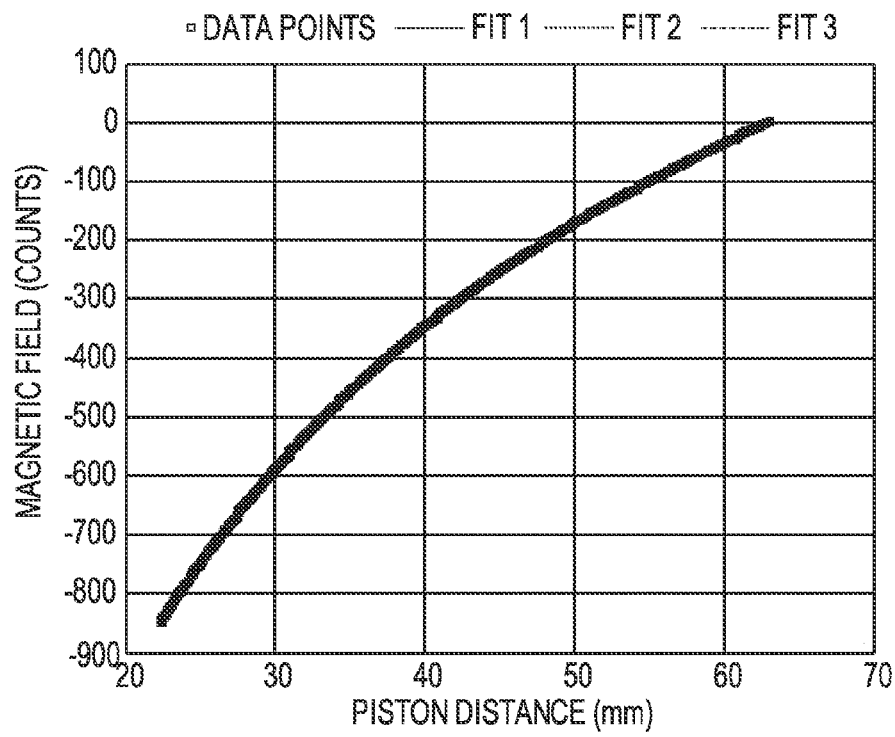
FIG. 9A shows a graph of magnetic field versus piston distance.
Figure 9B:
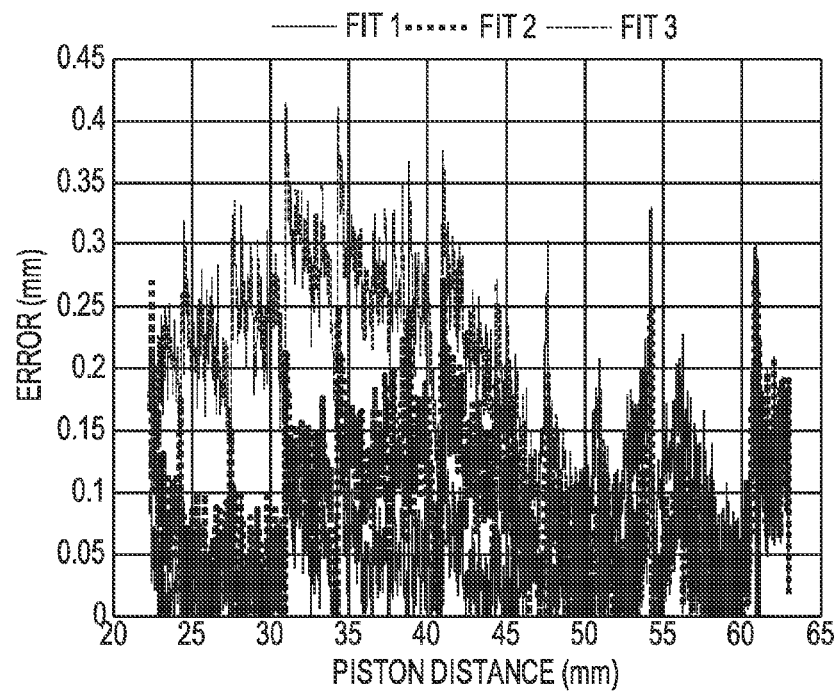
FIG. 9B shows a graph of error versus piston distance.

The fitted curve and the error are shown in FIGS. 9A and 9B (Fit 1), respectively. FIG. 9A shows a graph of magnetic field (vertical axis) versus piston distance (horizontal axis). FIG. 9B shows a graph of error (vertical axis) versus piston distance (horizontal axis).

B. Method 2—Minimax Fitting

The previous least-squares algorithm is based on minimizing the square of the errors or the following expression:

$$J = \|e\|_2^2 = e^T e = (y - HX)^T (y - HX) \qquad \text{Equation XXVIII}$$

The error in the previous case is given in the following Equation XXIX:

$$e = \left( B_x x_{p\text{-}LVDT} - [-B_x \; -(x_{p\text{-}LVDT} - x_{p0\text{-}LVDT})] \begin{bmatrix} \hat{e} \\ \hat{q} \end{bmatrix} \right) \qquad \text{Equation XXIX}$$

However, we are interested in finding p and e that minimizes the error between the distance obtained from the AMR sensor and the distance from the LVDT sensor uniformly across the piston motion range. This is equivalent to minimizing the maximum error or minimizing the infinity norm of the errors. This problem can be written as follows:

$$\text{minimize max}_i \, |x_{pi-LVDT} - x_{pi-AMR}| \quad \text{Equation XXX}$$

where:

$$x_{pi-AMR} = \frac{qx_{p0-LVDT} - B_{xi}e}{B_{xi} + q} \,\, \& \,\, q = \frac{p}{x_{p0-LVDT} + e}$$

The problem defined in Equation XXX can be rewritten by defining a new variable and transforming it into a problem with linear objective as follows:

$$\text{minimize } \gamma \quad \text{Equation XXXI}$$

$$\text{subject to } \left(x_{pi-LVDT} - \frac{qx_{p0-LVDT} - B_{xi}e}{B_{xi} + q}\right) \leq \gamma$$

and $$-\left(x_{pi-LVDT} - \frac{qx_{p0-LVDT} - B_{xi}e}{B_{xi} + q}\right) \leq \gamma$$

$$i = 1, 2, \ldots, n$$

Referring to FIG. 8, it can be seen that the magnetic field decreases as the piston moves from its initial position, $x_{p0}$, and gets closer to the magnetic sensor. Hence, we should have:

$$\frac{p}{x_{p0-LVDT} + e} = q \leq -B_{xi} \text{ for } i = 1, 2, \ldots, n \quad \text{Equation XXXII}$$

Now, the problem defined in Equation XXXI can be rewritten as follows:
minimize $\gamma$ subject to $(\gamma - x_{pi-LVDT} + x_{p0-LVDT})q - B_{xi}e \leq (x_{pi-LVDT} - \gamma)B_{xi}$ and $(\gamma + x_{pi-LVDT} - x_{p0-LVDT})q + B_{xi}e \leq (-x_{pi-LVDT} - \gamma)B_{xi}$ $q + B_{xi} \leq 0 \, q + B_{xi} \leq 0$ $i = 1, 2, \ldots, n$ \quad Equation XXXIII The problem defined in Equation XXXIII can be solved iteratively using a bisection algorithm as follows:
assuming that the optimal $\gamma$ is in the interval [l, u].
repeat solving feasibility problem for $\gamma = (u+l)/2$ $(\gamma - x_{pi-LVDT} + x_{p0-LVDT})q - B_{xi}e \leq (x_{pi-LVDT} - \gamma)B_{xi}$ $(\gamma + x_{pi-LVDT} - x_{p0-LVDT})q + B_{xi}e \leq (-x_{pi-LVDT} - \gamma)B_{xi}$ $q + B_{xi} \leq 0$ $i = 1, 2, \ldots, n$ if feasible u:=$\gamma$, if infeasible l:=$\gamma$
until u−l≤∈

With this method, the optimal p and e are obtained, which are presented in Table I (Method 2) above. As can be seen from Table I, the maximum error is reduced by about 20 percent compared to using the least squares method. The fitted curve and the error are shown in FIGS. 9A and 9B (Fit 2), respectively.

VI. One-Time Parameter Estimation Using Piston Stroking and Magnetic Sensors Only (Method 3)

In the previous section, the equation parameters, p and e, were obtained by fitting a curve to the magnetic field versus actual distance data points. The actual distance was obtained from the installed LVDT sensor on the FPE. However, if there is not an LVDT or other type of displacement measurement available, these methods cannot be applied. In a real-world engine on a car, no additional displacement sensor is likely to be available. In this section, a description is provided about how to use two AMR sensors only to obtain the equation parameters. With this method, one can estimate the position of the piston using AMR sensors without the need of any additional distance sensors for calibration. The two AMR sensors are aligned along the longitudinal axis of motion of the cylinder. The distance between the two sensors is d=38 mm.

We have the following equation for the two sensors:

$$\begin{cases} B1_x = \dfrac{p}{x_p + e} - \dfrac{p}{x_{p0} + e} \\ B2_x = \dfrac{p}{x_p + e + d} - \dfrac{p}{x_{p0} + e + d} \end{cases} \quad \text{Equation XXXIV}$$

Solving for $x_p$ from the first equation in Equation XXXIV and replacing into the second equation in Equation XXXIV, results in the following:

$$x_p = \frac{p}{B1_x + \dfrac{p}{e + x_{p0}}} - e \quad \text{Equation XXXV}$$

$$B2_x = \frac{p}{d + \dfrac{p}{B1_x + \dfrac{p}{e + x_{p0}}}} - \frac{p}{d + e + x_{p0}} \quad \text{Equation XXXVI}$$

The above equation and the data points from the two AMR sensors can be used to obtain p and e by applying the iterated least squares method. However, it has been observed that the parameter estimates did not converge consistently in this case. In order to make the algorithm converge reliably, the measurements from the final point of the position of the piston can be included, which will be:

$$\begin{cases} B1_{xf} = \dfrac{p}{x_{pf} + e} - \dfrac{p}{x_{p0} + e} \\ B2_{xf} = \dfrac{p}{x_{pf} + e + d} - \dfrac{p}{x_{p0} + e + d} \end{cases} \quad \text{Equation XXXVII}$$

In general, this final point would be available only by knowing the range of motion of the piston. In other words, to use this method, one only needs to move the piston from one end to the other end, record the AMR sensors signals and know the motion range of the piston. Then, we will have the following measurements:

$$\begin{cases} B2_{xi} = h_1(B1_x, p, e) + v_{1i} \text{ for } i = 1, 2, \ldots, n \\ B1_{xf} = h_2(x_{pf}, p, e) + v_2 \\ B2_{xf} = h_3(x_{pf}, p, e) + v_3 \end{cases} \quad \text{Equation XXXVIII}$$

where:

$$h_1(B1_x, p, e) = \frac{p}{d + \dfrac{p}{B1_x + \dfrac{p}{e + x_{p0}}}} - \frac{p}{d + e + x_{p0}}$$

$$h_2(x_{pf}, p, e) = \frac{p}{x_{pf} + e} - \frac{p}{x_{p0} + e}$$

$$h_3(x_{pf}, p, e) = \frac{p}{x_{pf} + e + d} - \frac{p}{x_{p0} + e + d}$$

Here, the noise was assumed to be additive for simplicity. Now using the iterated least squares method, one can obtain p and e, which are presented in Table I (Method 3) above. The fitted curve and the error are shown in FIGS. 9A and 9B (Fit 3), respectively. It can be seen that by using only two AMR sensors without any other calibrating devices, one can get the position error to be within a maximum of 0.4 mm.

Figure 10:
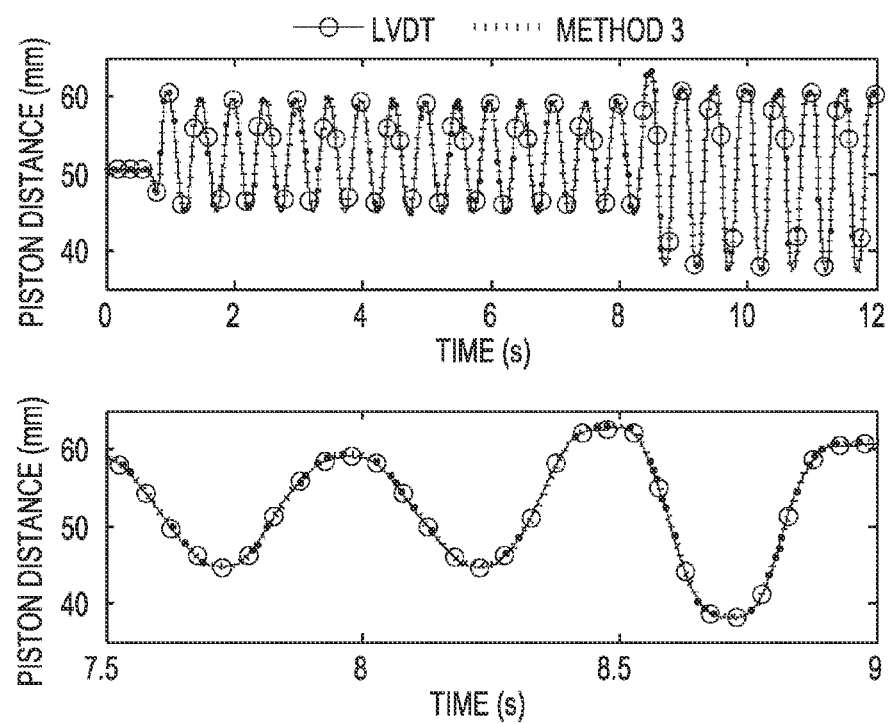
FIG. 10 shows a graph of piston distance versus time for magnetic sensors and an LVDT sensor in a first experiment.
Figure 11:
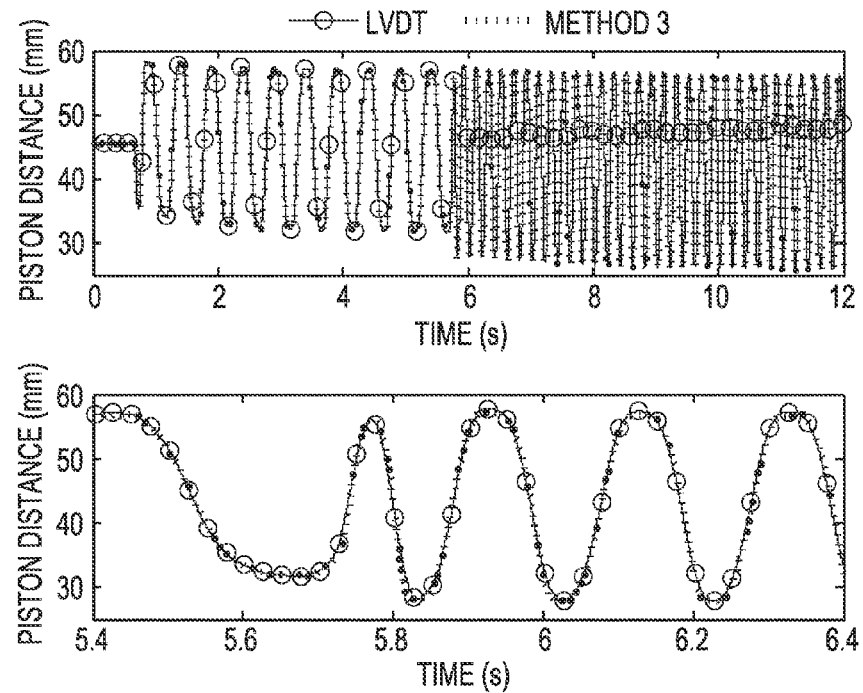
FIG. 11 shows a graph of piston distance versus time for magnetic sensors and an LVDT sensor in a second experiment.

Once the equation parameters p and e are known, the distance from the AMR sensors can be calculated using Equation XXI. FIGS. 10 and 11 show results of two experiments with the FPE. FIG. 10 shows a graph of piston distance (vertical axis) versus time (horizontal axis) for AMR sensors and an LVDT sensor in a first experiment. FIG. 11 shows a graph of piston distance (vertical axis) versus time (horizontal axis) for AMR sensors and an LVDT sensor in a second experiment. In the first experiment, the FPE started running at 2 Hz and the amplitude was increased over time. In the second experiment, the FPE started running at 2 Hz and the frequency increased to 5 Hz during the test. It can be seen that in both cases, the AMR sensors provide an excellent estimate of the piston position, as verified by the LVDT sensor.

VII. Adaptive Parameter Estimation and Real-Time Position Estimation

In section VI, a method was described for estimation of the parameters in Equation XXI using two AMR sensors. In the described method (Method 3), the piston is moved from one end to the other end and the AMR sensor readings are recorded. Next, the iterated least squares method is applied to estimate the model parameters, p and e. Finally, the estimated parameters can be used along with Equation XXI or Equation XXXIV to estimate piston position. In this section, two other methods (Methods 4 and 5) are proposed for real-time estimation of both piston position, $x_p$, and model parameters, p and e. An advantage of these methods is that it is not necessary to interrupt the regular operation of the engine and move the piston on a full stroke motion. The sensors along with the required electronics can be placed along the axis of the piston, and as the piston is continuing its normal operation, model parameters as well as piston position are estimated. The two algorithms are described in the following sections.

A. Method 4—Extended Kalman Filter (EKF)

As mentioned earlier, an objective of real-time position estimation is to estimate both piston position and model parameters in real-time so that it will not be necessary to interrupt the normal operation of the engine. Hence, the variables to be estimated are $x_p$, p and e. Also, the two AMR sensors, placed along the longitudinal axis of motion of the cylinder, provide measurements described by Equation XXXIV. As mentioned earlier, in Equation XXXIV, $x_{p0}$ is the piston position at time zero and $B1_x$ and $B2_x$ are the magnetic field readings at AMR sensors 1 and 2 from which the initial magnetic field has been subtracted.

Using the Extended Kalman Filter (EKF), we can measure the magnetic field from the two AMR sensors and estimate the variables. The state to be estimated is (dropping index p from x):

$$X = [x \ v \ a \ p \ e]^T \quad \text{Equation XXXIX}$$

where x, v and a are the piston position, velocity and acceleration respectively, and p and e are the model parameters.

The system and measurement equations are as follows:

$$X_k = FX_{k-1} + w_{k-1}$$

$$z_k = h(X_k, n_k)$$

$$w_k \sim (0, Q)$$

$$n_k \sim (0, R) \quad \text{Equation XL}$$

Where:

$$F = \begin{bmatrix} 1 & dt & 0 & 0 & 0 \\ 0 & 1 & dt & 0 & 0 \\ 0 & 0 & 1 & 0 & 0 \\ 0 & 0 & 0 & 1 & 0 \\ 0 & 0 & 0 & 0 & 1 \end{bmatrix} \quad \text{Equation XLI}$$

$$z_k = [B_{1k} \ B_{2k}]^T$$

$$h(X_k, n_k) = \begin{bmatrix} \dfrac{p_k}{x_k + e_k} - \dfrac{p_k}{x_0 + e_k} + n_k^1 \\ \dfrac{p_k}{x_k + e_k + d} - \dfrac{p_k}{x_0 + e_k + d} + n_k^2 \end{bmatrix}$$

where: dt is the sampling time, and d is the distance between the two AMR sensors. Also the acceleration of the piston is assumed to be zero-mean, which is a reasonable assumption considering the alternating motion of the piston.

The time update equations are as follows:

$$\hat{X}_k^- = F\hat{X}_{k-1}^+$$

$$P_k^- = FP_{k-1}^+ F^T + Q \quad \text{Equation XLII}$$

The measurement update equations are as follows:

$$K_k = P_k^- H_k^T (H_k P_k^- H_k^T + R)^{-1} \quad \text{Equation XLIII}$$

$$\hat{X}_k^+ = \hat{X}_k^- + K_k(z_k - h(\hat{X}_k^-, 0))$$

$$P_k^+ = (I - K_k H_k) P_k^-$$

where:

$$H_k = \frac{\partial h}{\partial X}\bigg|_{\hat{X}_k^-}$$

Figure 12:
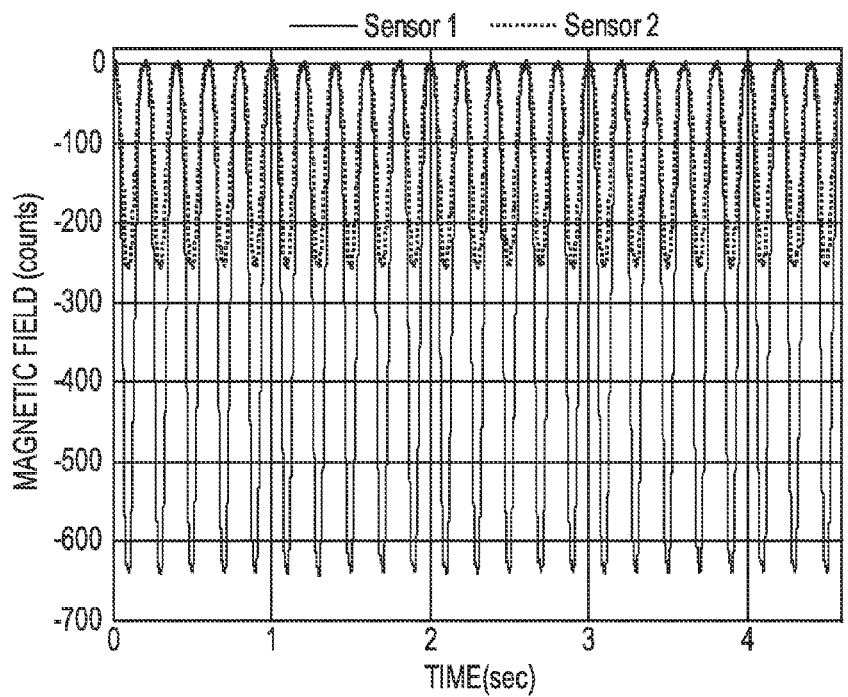
FIG. 12 shows a graph of magnetic field versus time measured by two AMR sensors.
Figure 13:
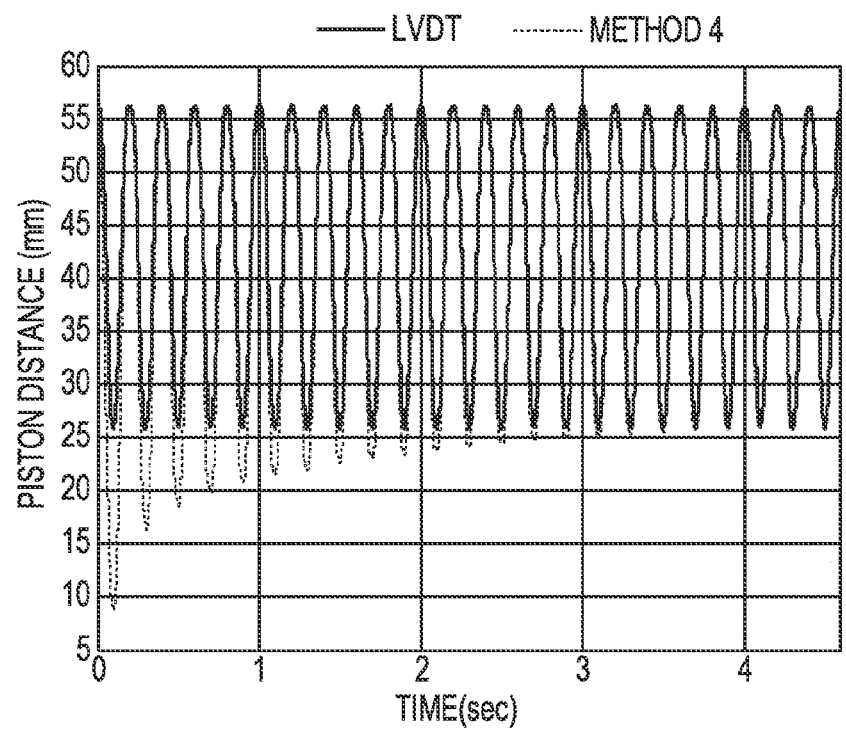
FIG. 13 shows a graph of piston distance versus time for the position estimates obtained by method 4 in comparison to LVDT measurements.
Figure 14:
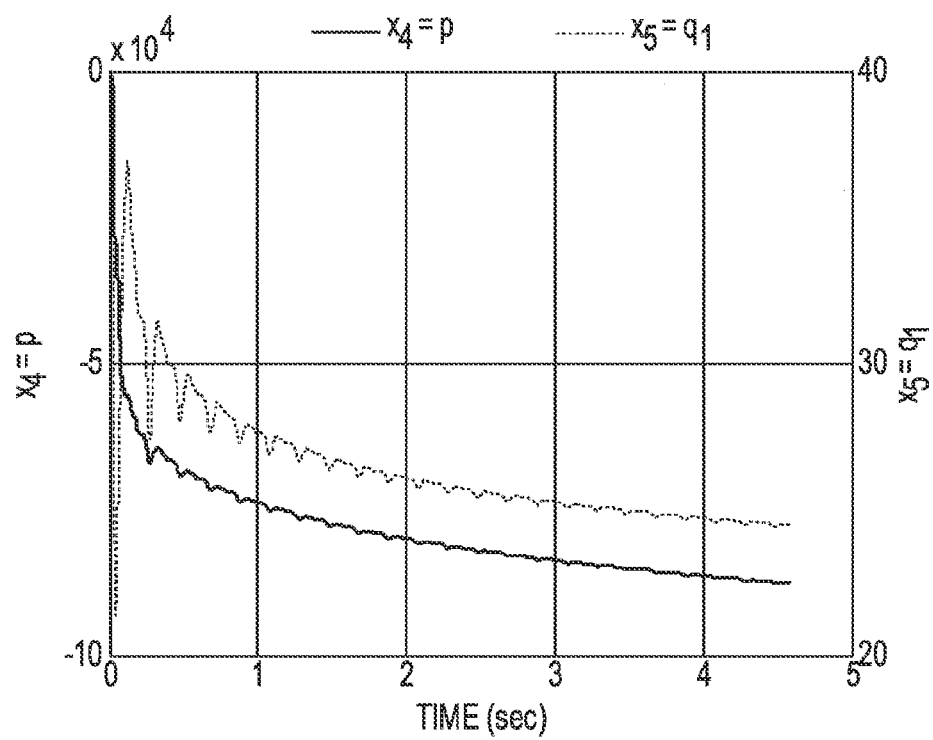
FIG. 14 shows a graph of model parameter estimates.

The method was then applied to a portion of data obtained from a test with the FPE where the piston motion has reached its steady-state behavior. The results are shown in FIGS. 12-14. FIG. 12 shows a graph of magnetic field (vertical axis) versus time (horizontal axis) measured by two AMR sensors. FIG. 13 shows a graph of piston distance (vertical axis) versus time (horizontal axis) for the position estimates obtained by method 4 in comparison to LVDT measurements. FIG. 14 shows a graph of model parameter estimates.

Figure 15:
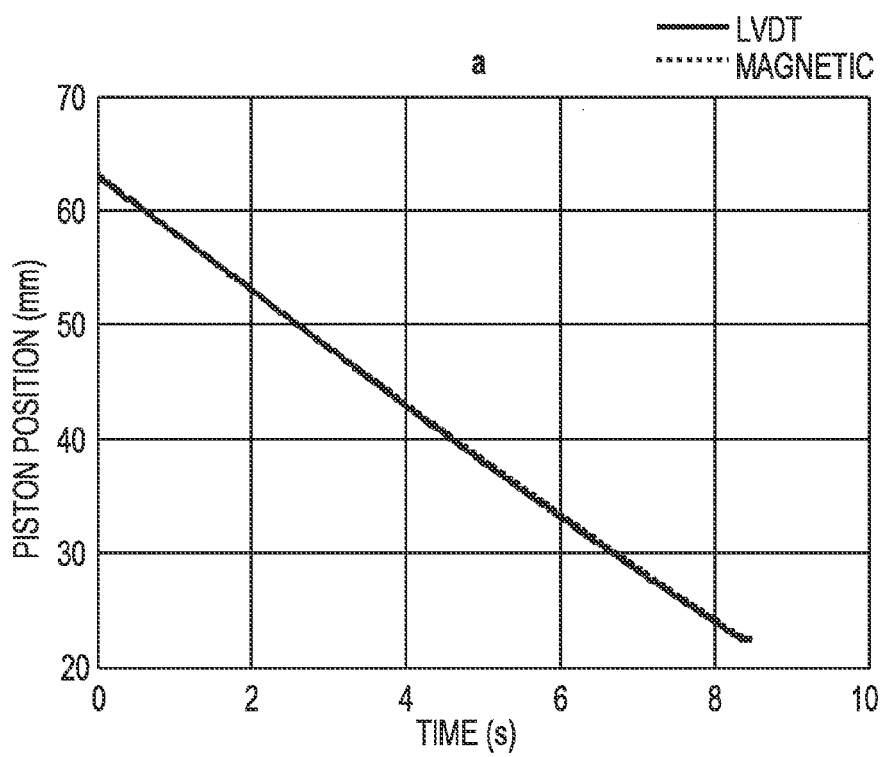
FIG. 15 shows the estimated position of a piston when the piston is moved a full stroke length after the parameter adaptation.
Figure 16:
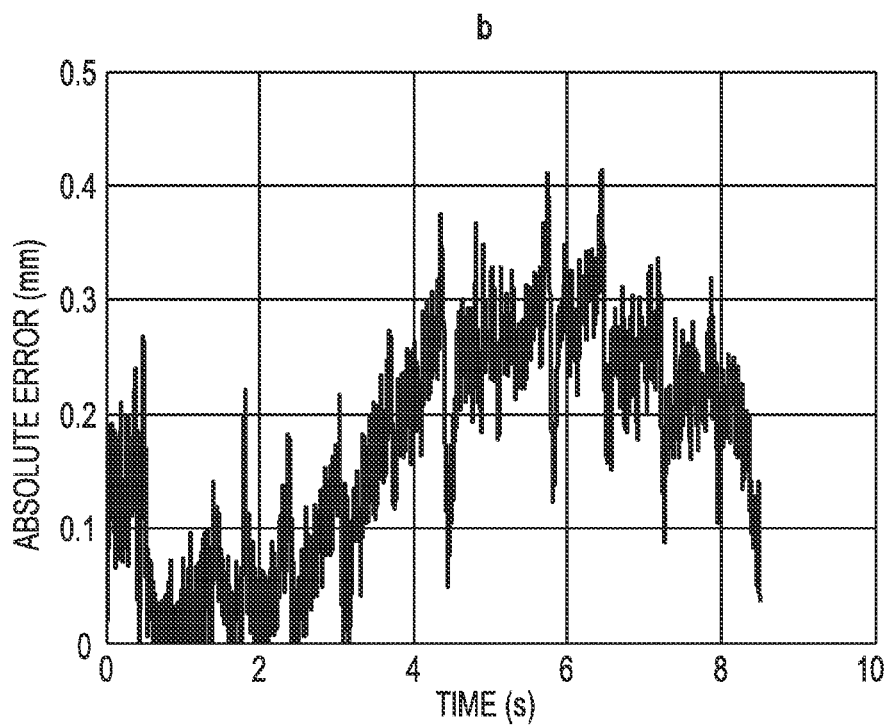
FIG. 16 shows the error between a Linear Variable Differential Transducer (LVDT) used as a reference and magnetic sensor estimate of piston position.

As can be seen in FIG. 13, it takes several cycles until the piston position estimation error reduces to a few millimeters. However, the few seconds of time taken before the sensor starts working well, is insignificant. Once a sensor is utilized for distance measurement of a particular object, it will work very accurately and reliably after the first few seconds of operation. FIG. 15 shows the estimated position of the piston when the piston is moved a full stroke length after the parameter adaptation. FIG. 16 shows the error between a Linear Variable Differential Transducer (LVDT) used as a reference and magnetic sensor estimate of piston position. It can be seen that the maximum error with respect to the LVDT reference is less than 0.4 mm.

It is possible to further improve the performance of the estimator by using the fact that the range of motion of a piston is generally known. The resulting improved estimator is described in the following section.

B. Method 5—Extended Kalman Filter (EKF)

From the geometry of the piston inside the engine and the location of the AMR sensors with respect to the engine, it is possible to know the minimum and maximum distance of the piston from the AMR sensors. In other words, the min and max of piston position, x, are known, which are synchronized with min and max of the measured magnetic field. For example, considering FIGS. 12 and 13, it can be seen that the magnetic field reading is about zero when the piston is furthest from the sensors. This is because initially, at t=0, the piston was at the furthest location from the AMR sensors and the initial magnetic field at t=0 is subtracted from the measurements. Now, when the piston comes to the closest distance to the AMR sensors, $x_f$, the absolute value of the magnetic field reaches its maximum. Hence, we will have the following extra measurement at this particular instant in time:

$$\begin{cases} B1_{xf} = \dfrac{p}{x_f + e} - \dfrac{p}{x_0 + e} + n_1 \\ B2_{xf} = \dfrac{p}{x_f + e + d} - \dfrac{p}{x_0 + e + d} + n_2 \end{cases} \quad \text{Equation XLIV}$$

Figure 17:
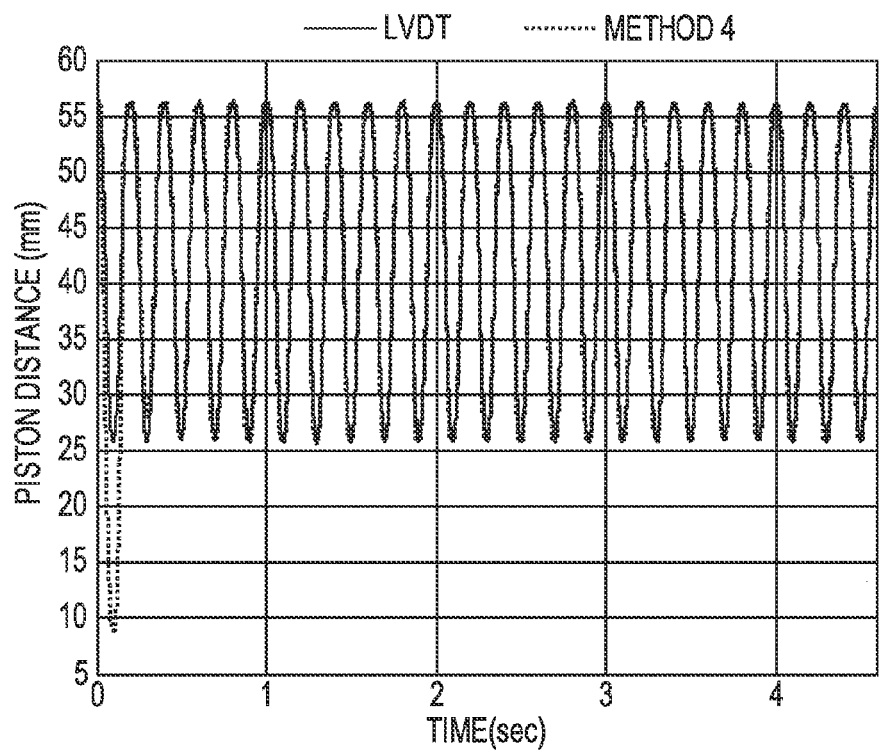
FIG. 17 shows a graph of piston distance versus time for the position estimates obtained by method 5 in comparison to LVDT measurements.
Figure 18:
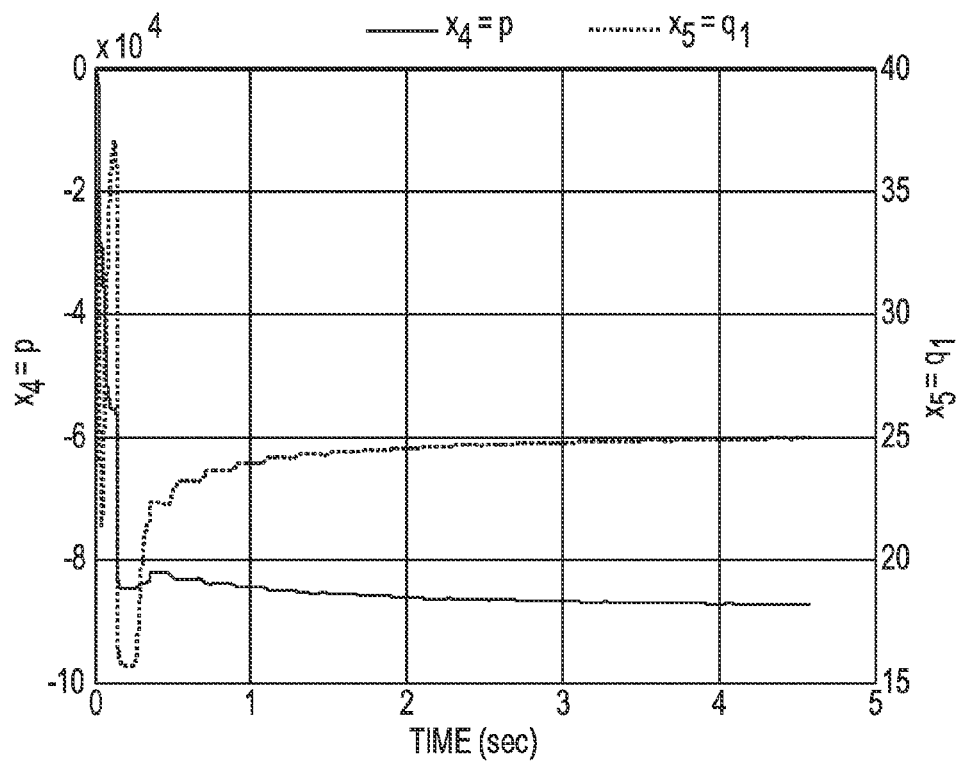
FIG. 18 shows a graph of model parameter estimates using method 5.

These extra measurements can be integrated into the Extended Kalman Filter from the previous section to update p and e whenever a peak in the magnetic field has been detected. The results from the new estimator are shown in FIGS. 17 and 18. FIG. 17 shows a graph of piston distance (vertical axis) versus time (horizontal axis) for the position estimates obtained by method 5 in comparison to LVDT measurements. FIG. 18 shows a graph of model parameter estimates using method 5. As can be seen in FIG. 17, piston position estimation converges to the true position within a couple of cycles.

The position measurement approach described above for the rectangular piston position application can be generalized and applied to position measurement for a number of other objects. Several real world applications using examples of other objects of different sizes and geometries will now be described. The general position measurement system that is common to all of these applications consists of the following components: (1) A set of two magnetic field measurement sensors, separated by a known longitudinal distance between them; (2) a model of the magnetic field around the ferromagnetic object under consideration, as a function of the position around the object; (3) a method to calculate the position of the object from the magnetic field function, by measuring the magnetic field using a sensor; and (4) a method to automatically estimate the parameters of the model for the object under consideration, by use of multiple longitudinally separated redundant sensors and an adaptive estimator.

It should be noted that no external magnets are required in this position measurement system—the inherent magnetic field of the ferromagnetic object is exploited. The position measurement system has been evaluated for a number of important applications of practical real-world importance, including the following: (1) Measurement of the position of a piston inside an internal combustion engine cylinder; (2) measurement of the distances between cars in imminent collision prediction applications; and (3) measurement of the position of a circular rod inside a common commercial hydraulic cylinder. The first of these applications was described above, and the second and third applications will be described below.

The following is a description of the measurement of the distances between cars in imminent collision prediction applications. Consider the use of these sensors on a car to measure the distance and velocity to another car for detection of an impending collision. By detecting an unavoidable imminent collision just before it occurs, several occupant protection measures can be taken. These go beyond pre-tightening of seat belts and pre-inflation of air bags, to also include active enhancement of crush space inside the car, seat-back control to better position the driver with respect to the steering wheel and use of external airbags to cushion the impact of the crash. Current collision detection systems based on radar and laser sensors do not work at the sub-meter distances needed for reliable detection of imminent unavoidable collisions. Since a car can make last minute lane changes, the occurrence of a collision has to be detected with very high reliability, in order to initiate measures such as air bag inflation. Such reliable detection can occur only at sub-meter distances. Furthermore, laser and radar sensors are too expensive to distribute all around the car for such imminent collision detection applications. The magnetic sensors described herein, on the other hand, are inexpensive enough to distribute all around the vehicle.

A car is roughly rectangular in shape and hence is expected to have a magnetic field function very similar to the rectangular piston, although it is a much larger physical object. A number of tests with different vehicles were performed in order to investigate the magnetic field generated by an encountered vehicle as a function of distance. FIG. 19 shows a general schematic of the preliminary tests. A magnetic sensor and a sonar sensor were packaged on a PCB together with a microprocessor that reads the sensor signals and transmits their values to a computer.

Based on the magnetic field analysis in the previous section and based on experimental data measured from a Chevrolet Impala vehicle, it was observed that below a threshold distance, $x_{th}$, the following relation can be used between magnetic field and distance:

$$B = \dfrac{p}{x} + q \quad x \le x_{th} \quad \text{Equation XLV}$$

where: B is the magnetic field, x is distance of the vehicle from the sensors, and p and q are vehicle dependent parameters.

Figure 20A:
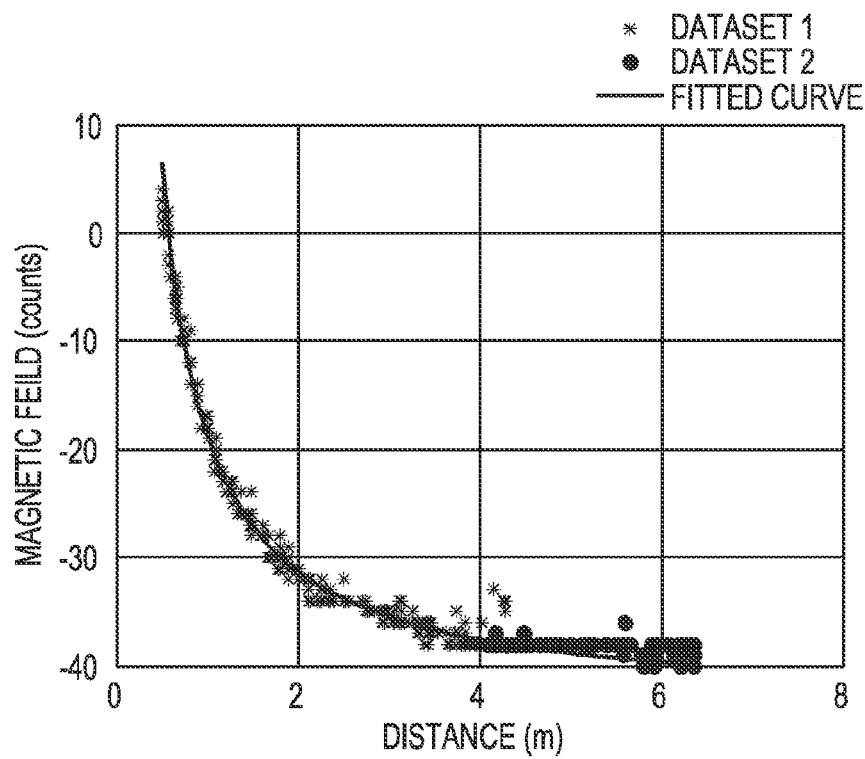
FIG. 20A shows a result of fitting a magnetic field equation for a vehicle to data points.

FIG. 20A shows the result of fitting Equation XLV to data points. In FIG. 20A, dataset 1 is the set of data points obtained after the vehicle gets closer than a threshold distance $x_{th}$ to the sensors. This dataset was used for curve fitting. Dataset 2 is the set of data points from the same experiment where the vehicle was further than $x_{th}$ from the sensors and is plotted for comparison. Equation XLV was also verified by fitting to experimental data from various other vehicles, including a VW Passat, a Hyundai Elantra, and a Honda accord vehicle. The following Table II summarizes the results of the curve fitting for each experiment showing coefficient of determinacy ($R^2$) of the fitted curve and estimated $x_{th}$ for a number of different vehicles from different car manufacturers:

TABLE II

Results from Curve Fitting

| Vehicle | $\|p\|$ | $B_{stat} - q$ | $R^2$ | $x_{th}$ |
|---|---|---|---|---|
| Chevy Impala | 25.2 | 3.2 | 0.997 | ~4.8 |
| Honda Accord | 28.4 | −6.7 | 0.999 | ~3.2 |
| VW Passat | 74.3 | 14.3 | 0.997 | ~4.5 |
| Hyundai Elantra | 10.2 | −3.2 | 0.999 | ~3 |

Based on Equation XLV, knowing parameters p and q, one would be able to estimate the distance by using only one magnetic sensor. However, these parameters change from one vehicle to another vehicle and cannot be known a priori. Therefore, a challenge would be to estimate p and q accurately and quickly in real time and use them to estimate the distance of the approaching vehicle from the sensors.

To address this challenge, two AMR sensors located apart from each other by a distance d in the X-axis, as shown in FIG. 19, is again used. The approaching vehicle is assumed to be close enough to affect both AMR sensors. The use of two sensors enables the estimation of both parameters p and q. The vehicle position can then be subsequently obtained. The estimator used for obtaining vehicle position is similar to the one discussed in previous section.

Figure 20B:
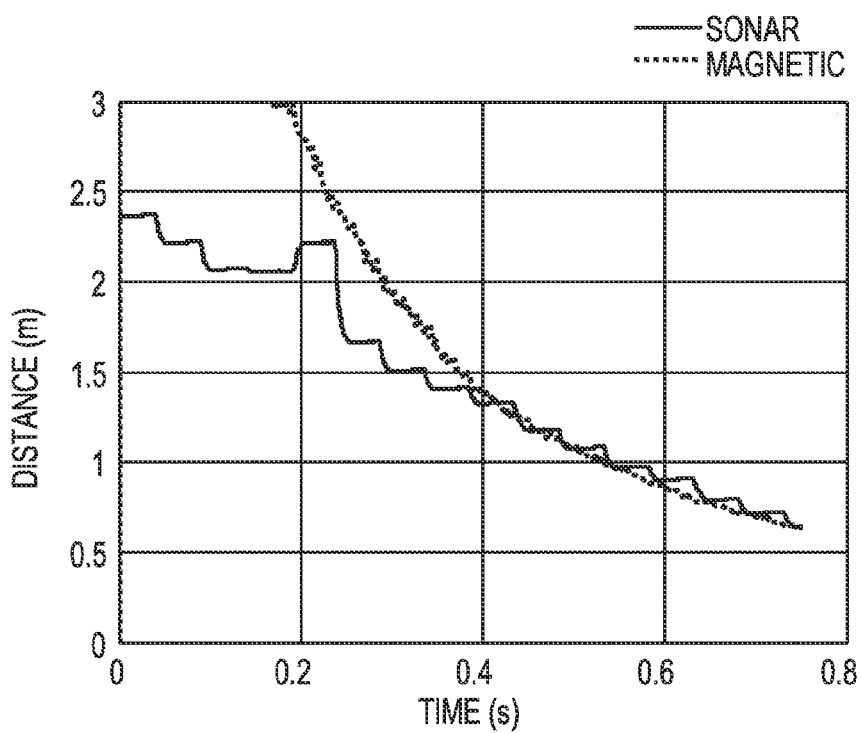
FIG. 20B shows a position estimation comparison between magnetic sensors and a sonar sensor.

Applying the estimator to data obtained from experiments, p and q can be estimated, and an estimate of distance can be obtained. To verify this, tests were performed in which the vehicle moved toward the sensors from an initial distance and sensor outputs were recorded. Then a portion of data in which, according to the sonar sensor, the vehicle was closer than $x_{th}$ to the sensors was selected and the designed EKF estimator was applied. An example result is shown in FIG. 20B. The resulting position estimation as seen in FIG. 20B converges very well to the position measured by the sonar sensor.

The following is a description of the measurement of the position of a circular rod inside a common hydraulic cylinder. A clear change in the magnetic field is measured when the piston moves from one end to the other end. The main source of the generated magnetic field is assumed to be the metallic rod of the piston since the piston head is made of plastic.

Figure 21:
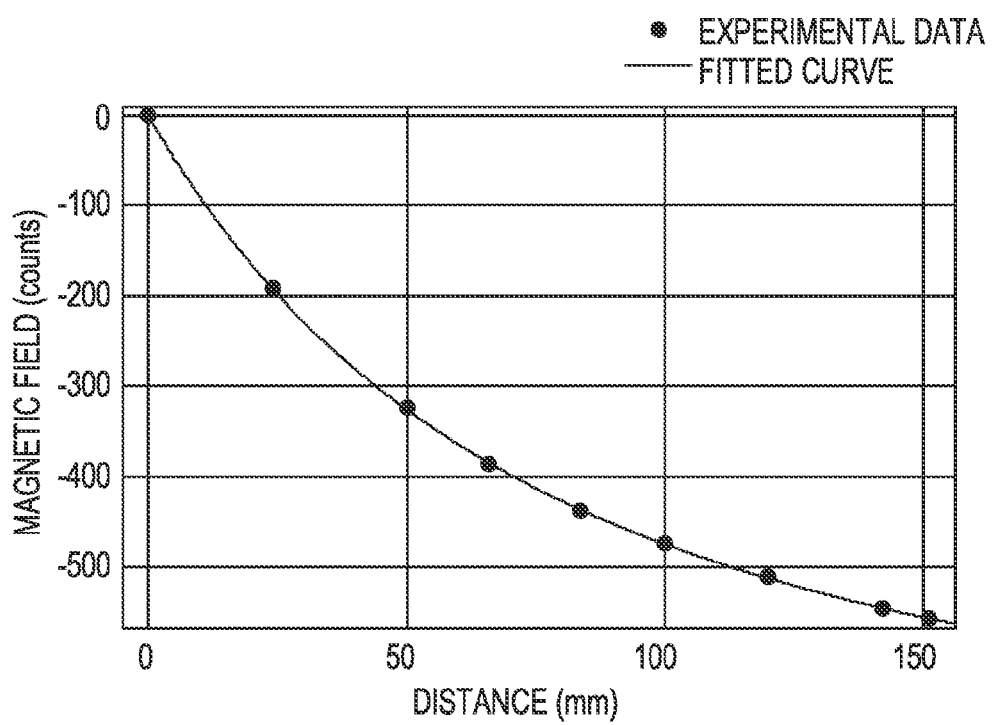
FIG. 21 shows a match between experimental data and a developed model for a hydraulic cylinder application.

In order to verify the proposed measurement concept, the piston was moved a full stroke and was stopped at discrete positions. Since the hydraulic cylinder is not equipped with any other sensors, a ruler was used to obtain the distance at these discrete locations. Magnetic field was measured using the magnetic sensor which was placed at about 150 mm from the piston head. FIG. 21 shows the data points.

The magnetic field along the longitudinal axis of the cylinder will have an inverse square relationship with distance, as shown by the approximation of Equation III given above. Defining x as the piston position changing from zero to the stroke length, and e as the distance from the magnetic sensor to the piston at x=0, we have:

$$x_A = x + e \qquad \text{Equation XLVI}$$

Hence the approximation of Equation III can be written as follows:

$$B_x = \frac{p}{(x+e)^2} \qquad \text{Equation XLVII}$$

Since the initial magnetic field is subtracted from the measurement, Equation XLVII should be modified to the following:

$$B_x = \frac{p}{(x+e)^2} - \frac{p}{(x_0+e)^2} \qquad \text{Equation XLVIII}$$

In order to verify the appropriateness of this model for the hydraulic cylinder application, Equation XLVIII was fit to the data obtained from the hydraulic piston. FIG. 21 shows the result. As seen from FIG. 21, there is a very good match between the experimental data and the developed model. The piston was moved from $x_p=0$ and hence, we have $x_0=0$. The model parameters are identified to be $p=1.627 \times 10^7$ and $e=148.4$ which agrees with the fact that the magnetic sensor was placed at about 148.4 mm from the piston head at $x_p=0$.

Embodiments disclosed herein can reject disturbances due to other magnetic objects in applications wherein the moving object being monitored has a non-static (e.g., oscillatory) motion. FIGS. 22A-22C show how a disturbance due to the presence of an unexpected magnetic object is detected and then rejected (compensated) by embodiments disclosed herein. FIG. 22A shows a graph of magnetic field (vertical axis) versus time (horizontal axis) when a disturbance in the magnetic field occurs. FIG. 22B shows a graph of piston position (vertical axis) versus time (horizontal axis) to show how existing techniques do not adjust for the disturbance in the magnetic field. FIG. 22C shows a graph of piston position (vertical axis) versus time (horizontal axis) to show how embodiments disclosed herein adjust for the disturbance in the magnetic field. The system is able to do such disturbance rejection due to the fact that a) It is based on a model of the magnetic field as a function of position, and b) It utilizes redundant magnetic sensors with known distances between these sensors.

The rejection of disturbances will now be described in further detail. In one embodiment, a tiny magnet is placed on the piston of a pneumatic actuator, and the magnetic field created by this magnet is modeled. Magnetic sensors located outside the actuator are then used to accurately estimate the position of the remote piston inside the actuator. A challenge in the usage of such magnetic sensors (especially at large distances) is the influence of disturbances caused by other ferromagnetic objects being brought close to the piston. External ferromagnetic objects disturb the original magnetic field function causing large errors in position estimation. This disclosure shows how the use of a quad arrangement of magnetic sensors can be used to eliminate the influence of any external magnetic disturbance. Experimental results demonstrate that sub-millimeter accuracies in position measurement can be obtained with such a system in spite of disturbances from external ferromagnetic objects.

As the sensors are estimating the piston position, any ferromagnetic object coming close to the sensors can cause a shift in sensors readings and result in less accurate position estimation. To address this issue, a method is disclosed to reject the effect of such external disturbances. This method is not just specific to magnetic sensors and this application, but also has the potential of being applied to other types of sensors in different applications.

The experimental setup used to evaluate the performance of the proposed sensing principle consists of a pneumatic actuator made of aluminum, two external magnetic sensors with a separation of 28 mm between them, a Linear variable differential transformer (LVDT) which is used as a reference position sensor for comparison, and electronics to read sensors outputs. The LVDT has a linearity of +0.25 mm and a bandwidth of 200 Hz. It is worth mentioning that the exact value of the initial distance between the sensors and piston head is obtained as one of the parameters of the sensing system. Hence, it is not required to measure this distance; rather it is automatically calibrated as one of the parameters of the sensing system.

Figure 23:
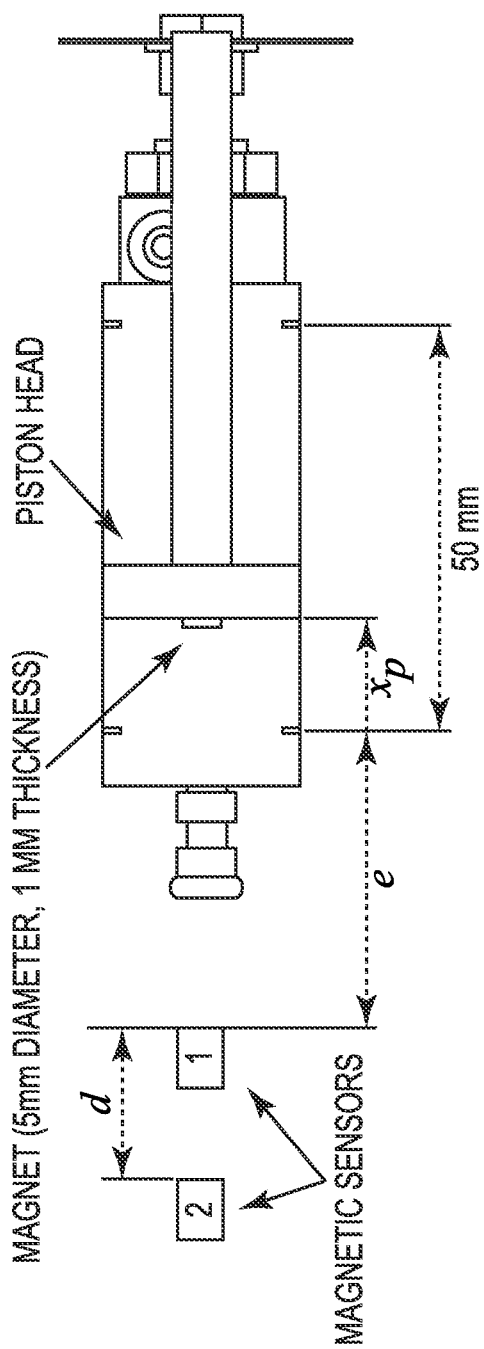
FIG. 23 shows a position measurement system with two magnetic sensors and a small magnet on a piston head.
Figure 24:
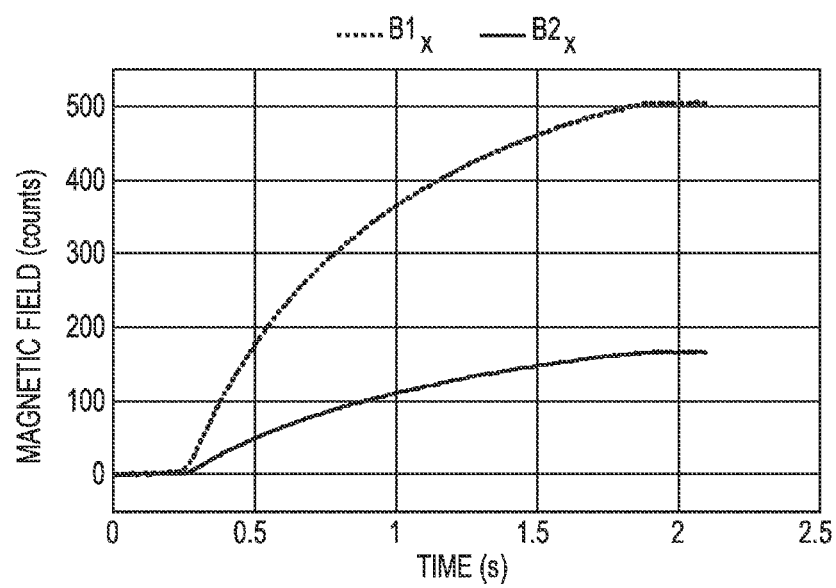
FIG. 24 shows sensor readings from the system shown in FIG. 23 when a piston is moved a full stroke.

Since the piston is made of aluminum, it does not create a change in the measured magnetic field when it is moved from one end to the other end. Hence, a small magnet is attached to the piston head as shown in FIG. 23. After adding the magnet to the piston head, changes in the magnetic field are observed with any motion of the piston. FIG. 24 shows the measured magnetic field from the two magnetic sensors as the piston moves through a full stroke. In the following discussion, a model is developed relating the magnetic field measurements to the piston position.

Considering FIG. 23, we want to obtain a mathematical relation between the magnetic field measured by the magnetic sensor "1", $B_x$, and the piston position $x_p$. The sensors are about 70 mm from the piston head at the closest distance ($x_p=0$). On the other hand, the size of the magnet attached to the piston head (1 mm in thickness and 5 mm in diameter) is very small compared to this distance. Hence it is reasonable to assume that the magnetic field at the location of the magnetic sensors due to the attached magnet can be modeled as a dipole. The magnetic field of a dipole at a distance x along its axis is given by the following Equation XLIX:

$$B_x = \frac{\mu_0 m_0}{2\pi x^3}, B_x = \frac{\mu_0 m_0}{2\pi x^3}, \quad \text{Equation XLIX}$$

where: $B_x$ is the magnetic field, $m_0$ is the dipole magnetic moment and $\mu_0$ is the permeability of free space.

Defining e as the initial distance between the piston head and magnetic sensor "1", $x_p$ as the piston position (changing from $x_p=0$ mm to $x_p=50$ mm), and $$p = \frac{\mu_0 m_0}{2\pi},$$

we can rewrite Equation XLIX as follows:

$$B_x = \frac{p}{(x_p + e)^3}. \quad \text{Equation L}$$

Also, since the static magnetic field is subtracted at the beginning of each test, which also includes any field created by the outer piston at its initial position $x_{p0}$, the magnetic field measured by sensor "1" can be written as follows:

$$B_x = \frac{p}{(x_p + e)^3} - \frac{p}{(x_{p0} + e)^3}. \quad \text{Equation LI}$$

Subtracting the initial magnetic field is needed in order to remove the influence of the earth's magnetic field and other static or slowly varying magnetic fields. In order to use Equation LI for position estimation, we need to know the three parameters p, e and $x_{p0}$. However, it is not possible to estimate all three of these parameters from this equation, even if two sensors are used instead of one sensor, since the system becomes unobservable for three unknown parameters. However, the piston can be started from a known initial position (at the lower or upper bounds of motion of the piston, $x_p=0$ mm or $x_p$=Stroke Length=50 mm) for the first time and subsequently record the final position in memory to use it as the initial position for the next run. In the following discussion, a method is disclosed to estimate the model parameters. Once the model parameters are known, Equation LI can be used to estimate piston position $x_p$ by measuring magnetic field $B_x$.

One of the sensing algorithms discussed herein is for a rectangular piston with an inherent magnetic field and uses a linear relationship between $B_x$ and $1/x_p$. With the nonmagnetic piston and the tiny magnet shown in FIG. 23, the relationship between $B_x$ and $1/x_p$ is cubic. However, the same method for identification of model parameters can be used as long as we have a model relating $B_x$ and $x_p$. The parameter identification method is based on using two magnetic sensors and does not require any additional sensors for calibration. Consider the two magnetic sensors placed on the longitudinal axis of the cylinder as shown in FIG. 23. We will have the following equation for the two sensors:

$$\begin{cases} B1_x = \frac{p}{(x_p + e)^3} - \frac{p}{(x_{p0} + e)^3} \\ B2_x = \frac{p}{(x_p + e + d)^3} - \frac{p}{(x_{p0} + e + d)^3} \end{cases}, \quad \text{Equation LII}$$

where: d is the distance between the two sensors which is known.

Defining $$q = \frac{p}{(x_{p0} + e)^3}$$

and solving for $x_p$ from the first equation in Equation LII we have:

$$x_p = \left(\frac{p}{B1_x + q}\right)^{1/3} - e. \quad \text{Equation LIII}$$

Replacing $x_p$ in the second equation of Equation LII using Equation LIII, we have:

$$B2_x = \frac{p}{\left(\left(\frac{p}{B1_x+q}\right)^{1/3}+d\right)^3} - \frac{p}{(x_{p0}+e+d)^3}.$$ Equation LIV We can use Equation LIV and the data points from the two AMR sensors to obtain p and e by applying the iterated nonlinear least squares method. Besides these data points, moving the piston a full stroke length, $x_p=x_{p0}=0$ to $x_p=x_{pf}=$Stroke Length=50 mm, the following two measurements can be also adopted:

$$\begin{cases} B1_{xf} = \frac{p}{(x_{pf}+e)^3} - \frac{p}{(x_{p0}+e)^3} \\ B2_{xf} = \frac{p}{(x_{pf}+e+d)^3} - \frac{p}{(x_{p0}+e+d)^3} \end{cases}.$$ Equation LV Therefore, moving the piston a full stroke, we will have N+2 measurements:

$$\begin{cases} B2_{xi} = h_1(B1_x, p, e) + n_{1i} \text{ for } i=1, 2, \ldots, N \\ B1_{xf} = h_2(x_{pf}, p, e) + n_2 \\ B2_{xf} = h_3(x_{pf}, p, e) + n_3, \end{cases}$$ Equation LVI where: function $h_1$ is defined by Equation LIV, and functions $h_2$ and $h_3$ are defined by Equation LV.

Figure 25:
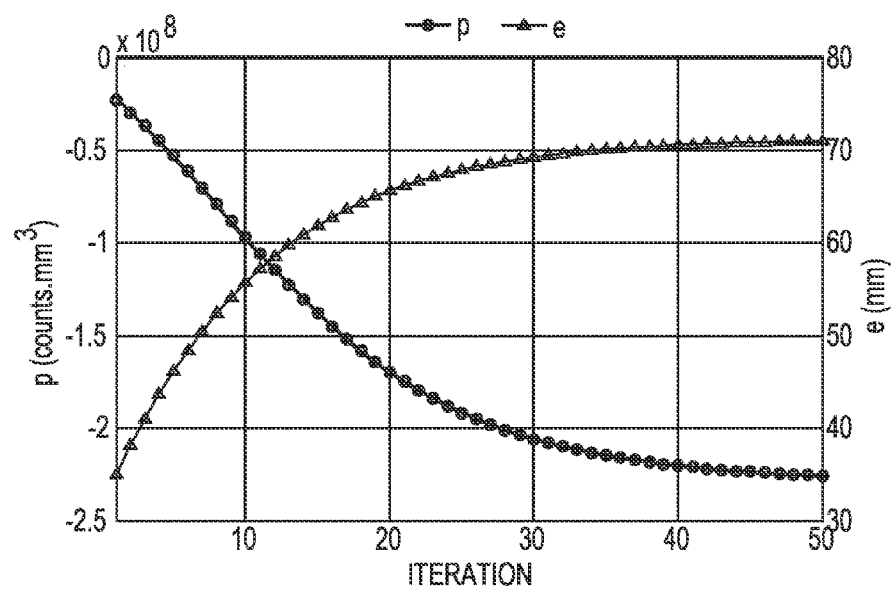
FIG. 25 shows the values of estimated parameters over iterations.

Here the noise is assumed to be additive for simplicity and N is the number of samples taken during the motion of the piston. Now we can use the iterated least squares method and the measurements from the two sensors, which are shown in FIG. 24, to obtain p and e. Recall that e is the initial distance between the piston head and magnetic sensors. Hence, we can get a rough initial estimate of e by guessing or using a ruler. An initial value of p can be obtained by plugging the initial value of e in either of the equations of Equation LII. The values of the estimated parameters over iterations are shown in FIG. 25. Thus, the actual values of the parameters are obtained automatically from this algorithm.

Figure 26:
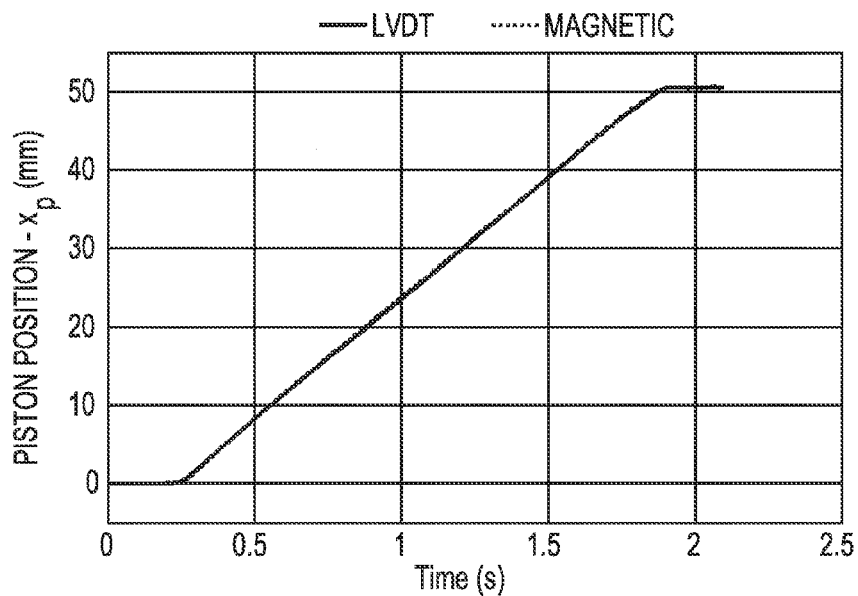
FIG. 26 shows piston position obtained from LVDT and magnetic sensors.
Figure 27:
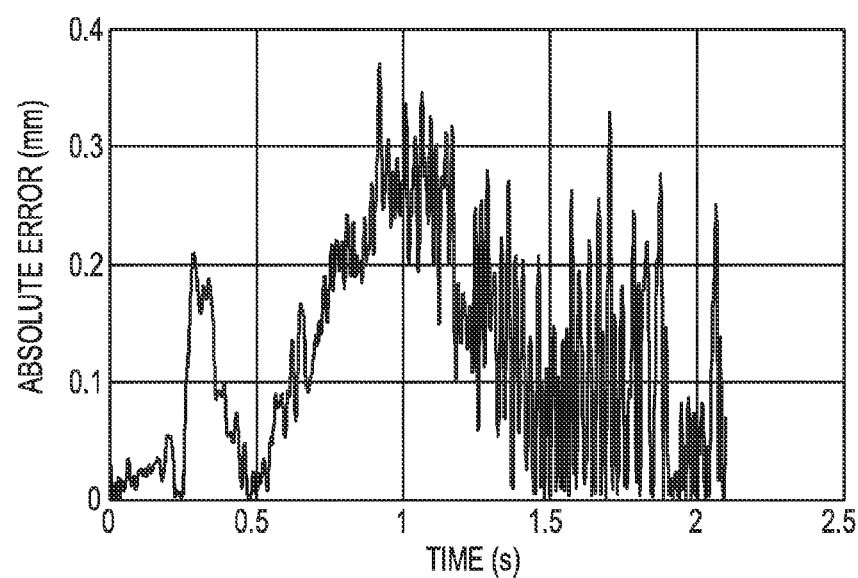
FIG. 27 shows the error in position estimation by the sensing system.

Knowing the model parameters, we can use either one of the equations in Equation LII and get an estimate of $x_p$ at each time instant as shown in FIG. 26. Comparing estimated position from magnetic sensors and the LVDT, we can calculate the error in the sensing system, which is shown in FIG. 27. FIG. 27 shows that the maximum error is less than 0.4 mm. Hence, using the developed magnetic field model, two inexpensive magnetic sensors and the calibration algorithm, the position sensing system has an accuracy of 0.4 mm without the need of any other type of sensors. Also note from FIG. 25 that the initial value of e was set to half of the actual value and yet the disclosed method is able to identify the true values of the parameters.

The position measurement approach described above for piston position measurement can be generalized and applied to position measurement for a number of other objects. The general steps to be followed are described below.

A first step is to derive an analytical function relating the magnetic field around the ferrous object to distance from the object. Hence, we have:

$$B_x = f(x_p, \lambda)$$ Equation LVII where: $x_p$ is the piston position, $\lambda$ is a vector of parameters in the model, and $B_x$ is the measured magnetic field.

The function $f(x_p, \lambda)$ should be injective and invertible for $x_p$, so that we can calculate the function g where:

$$x_p = g(B_x, \lambda) = f^{-1}(B_x, \lambda)$$ Equation LVIII

Equation LII shows an example for the function g. Note that if function $f$ is not injective and/or invertible, the methods described in section VII can be used to adaptively estimate both model parameters as well as position in real-time.

A second step is to place two magnetic sensors along the axis of motion of the object with a spacing of d. The magnetic field measured by the sensors will have the following relation with $x_p$:

$$\begin{cases} B1_x = f(x_p, \lambda) \\ B2_x = f(x_p+d, \lambda) \end{cases}.$$ Equation LIX Using Equation LVIII we get:

$$B2_x = f(g(B_x, \lambda) + d, \lambda).$$ Equation LX

The significance of Equation LX is that it is not dependent on position. Model parameters can be estimated from this equation using the measurements from the two sensors. Hence, no other reference sensors are required for calibration.

A third step is to move the object a full stroke length and record sensor measurements. Using these magnetic measurements and the fact that the stroke length is known, the following measurements are available:

$$B2_{xi} = f(g(B_{xi}, \lambda)+d, \lambda)+n_{1i} \; i=1,2,\ldots,N$$

$$B1_{xf} = f(x_{pf}, \lambda)+n_2$$

$$B2_{xf} = f(x_{pf}+d, \lambda)+n_3,$$ Equation LXI where: N is the number of samples taken during the object motion and n is the measurement noise.

A fourth step is to apply iterated nonlinear least squares or other parameter estimation algorithms to estimate model parameters $\lambda$.

A fifth step is to use Equation LVIII to estimate piston position $x_p$, by measuring the magnetic field $B_x$ in real-time.

Figure 28:
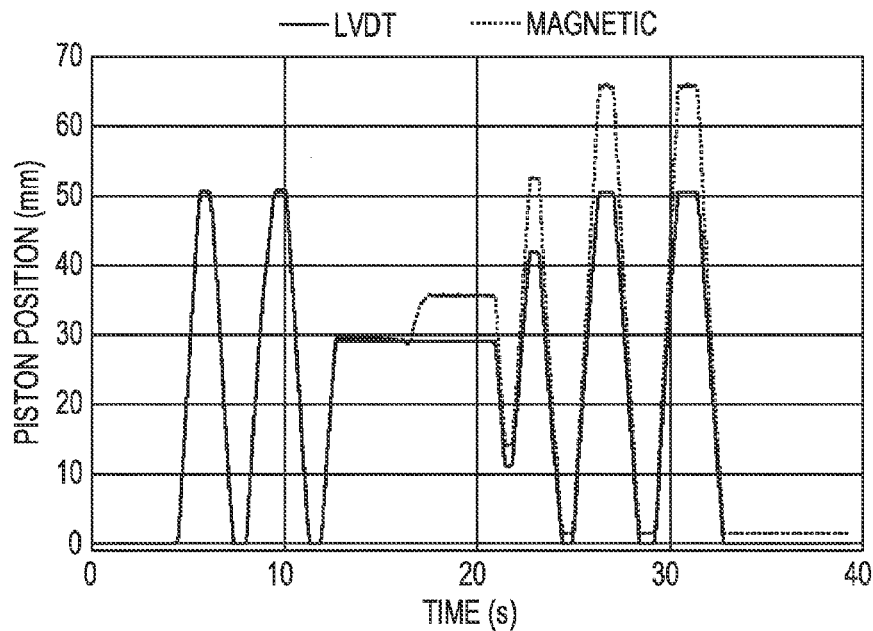
FIG. 28 shows piston positioned measured by LVDT and estimated from magnetic sensor when a disturbance exists.
Figure 29:
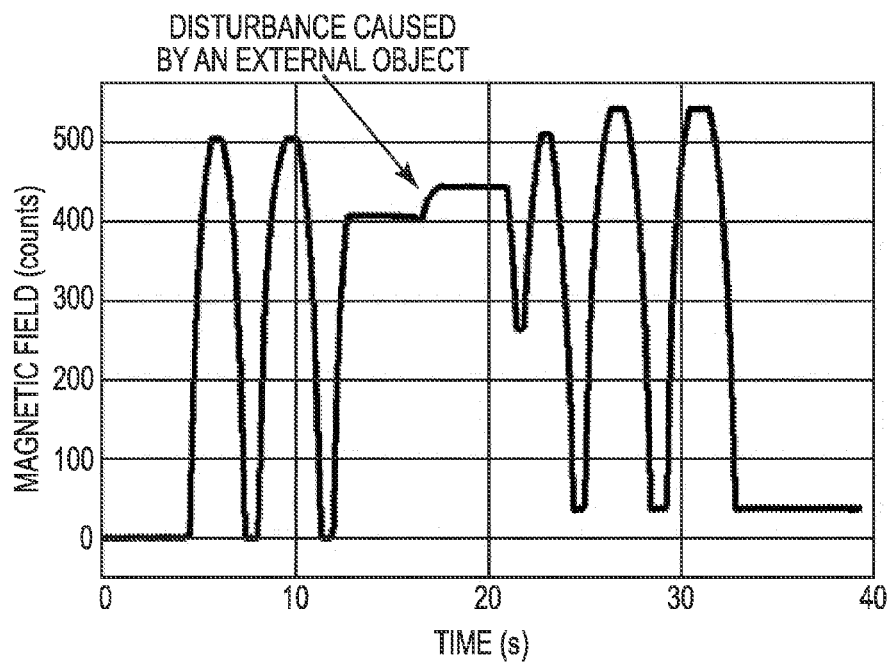
FIG. 29 shows a magnetic sensor measurement that gets affected by an external disturbance.

The problem of external disturbances on the magnetic sensors due to the unexpected presence of other ferromagnetic objects which cause inaccuracies in piston position estimation will now be discussed. As an example, consider FIG. 28, which shows the actual piston position as measured by the LVDT. FIG. 29 shows the signal from the magnetic sensor for the same test which gets affected by an external disturbance. The disturbance is created by bringing a ferromagnetic object (e.g., a pliers) from a far distance (with no impact on the sensor) close to the sensor. Consequently, the sensor signal starts deviating from its actual value (at t≅16 s) and reaches a final value as the object is placed next to the sensor. If the system does not correct for this disturbance, the position estimate obtained from the magnetic sensor measurements will be inaccurate as shown in FIG. 28. In this example, the error caused by the disturbance is as much as 10 mm.

Figure 30:
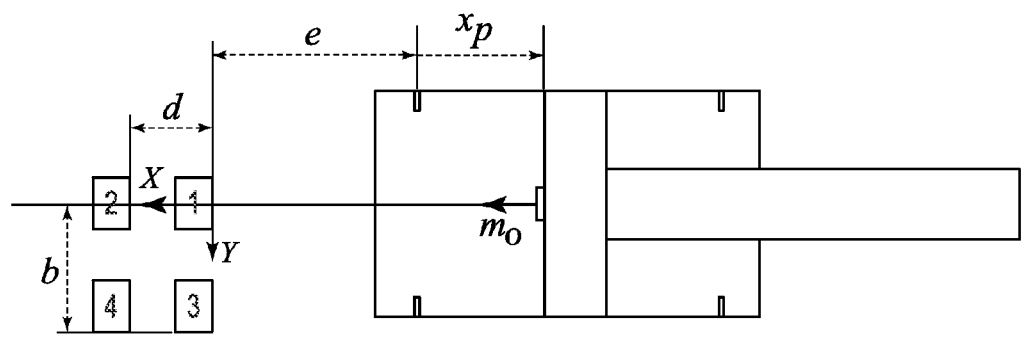
FIG. 30 shows a position sensing system with a quad arrangement of four magnetic sensors for disturbance rejection.

In order to address disturbance rejection and provide robustness, a method is described which is based on using a quad arrangement of four magnetic sensors as shown in FIG. 30. In the description above, a mathematical model relating the magnetic field measured by the sensors "1" and "2" to piston position was developed. For the disturbance rejection algorithm, we first derive a model relating the magnetic field measured by sensors "3" and "4", which are laterally offset from the axis of motion of the piston, to the piston position.

Figure 31:
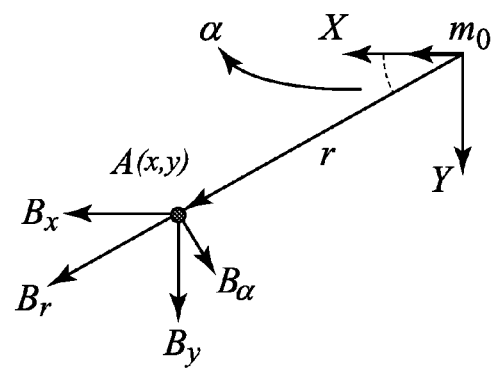
FIG. 31 shows the magnetic field of a dipole when sensors are placed on the side of a piston.

Considering FIG. 31, we have the following relations:

$$B_r = \frac{\lambda_0 m_0}{2\pi r^3}\cos(\alpha), \qquad \text{Equation LXII}$$

$$B_\alpha = \frac{\mu_0 m_0}{4\pi r^3}\sin(\alpha). \qquad \text{Equation LXIII}$$

Assuming that a magnetic sensor is placed at point A which measures $B_x$, we will have:

$$B_x = \frac{\mu_0 m_0}{4\pi r^3}(2\cos^2\alpha - \sin^2\alpha). \qquad \text{Equation LXIV}$$

If we express r and $\alpha$ in terms of x and y, and define $$p = \frac{\mu_0 m_0}{2\pi r^3},$$

we get:

$$B_x = \frac{p(2x^2 - y^2)}{2(x^2 + y^2)^{5/2}}. \qquad \text{Equation LXV}$$

From FIG. 30, we have $x = x_p + e$ and $y = b$. Hence:

$$B_x = \frac{p(2(x_p + e)^2 - b^2)}{2((x_p + e)^2 + b^2)^{5/2}}. \qquad \text{Equation LXVI}$$

Finally, subtracting the initial magnetic field from the sensors, we get:

$$B_x = \frac{p(2(x_p + e)^2 - b^2)}{2((x_p + e)^2 + b^2)^{5/2}} - \frac{p(2(x_{p0} + e)^2 - b^2)}{2((x_{p0} + e)^2 + b^2)^{5/2}}. \qquad \text{Equation LXVII}$$

The model parameters in Equation LXVII are p and e which can be estimated using sensors "1" and "2" and the method described above, and b which is known (similar to d). Note that Equation LI is a special case of Equation LXVII where b=0. The algorithm used for disturbance rejection will now be described.

Considering FIG. 30, we have the following measurements from the four sensors:

$$\begin{cases} B1_x = f_1(x_p) \\ B2_x = f_2(x_p) = f_1(x_p + d) \\ B3_x = f_3(x_p) \\ B4_x = f_4(x_p) = f_3(x_p + d) \end{cases}, \qquad \text{Equation LXVIII}$$

where: functions $f_1$ and $f_3$ are derived as Equation LI and Equation LXVII, respectively.

Now consider that a magnetic object gets close to the sensors and affects their signals. As a result, the field measured by the sensors can be expressed as:

$$\begin{cases} B1_x = f_1(x_p) + D_1 \\ B2_x = f_2(x_p) + D_2 \\ B3_x = f_3(x_p) + D_3 \\ B4_x = f_4(x_p) + D_4 \end{cases}. \qquad \text{Equation LXIX}$$

where: the $D_i$'s represent the influence of the disturbing magnetic object on each sensor.

In general, the disturbance is unknown, and we do not have any information about the $D_i$'s. Hence, we have four equations and five unknowns, $D_i$'s and $x_p$. However, it is possible to impose a constraint on $D_i$'s; since the four sensors are close to each other, we assume that we can fit a plane to the four disturbances added to the sensors. This is equivalent to the reasonable assumption that the magnetic field variation between adjacent sensors is monotonic.

A plane in 3-D space can be expressed as:

$$z = \rho_1 x + \rho_2 y + \rho_3, \qquad \text{Equation LXX}$$

where: $\rho_i$'s are plane parameters.

Now, consider three points in space: $(d, 0, D_2)$, $(0, b, D_3)$, and $(d, b, D_4)$. The plane which goes through these points in space can be obtained as follows:

$$\begin{cases} D_2 = \rho_1 d + \rho_3 \\ D_3 = \rho_2 b + \rho_3 \\ D_4 = \rho_1 d + \rho_2 b + \rho_3 \end{cases} \Rightarrow \qquad \text{Equation LXXI}$$

$$\begin{bmatrix} D_2 \\ D_3 \\ D_4 \end{bmatrix} = \begin{bmatrix} d & 0 & 1 \\ 0 & b & 1 \\ d & b & 1 \end{bmatrix} \begin{bmatrix} \rho_1 \\ \rho_2 \\ \rho_3 \end{bmatrix} \Rightarrow \begin{bmatrix} \rho_1 \\ \rho_2 \\ \rho_3 \end{bmatrix} =$$

$$\begin{bmatrix} d & 0 & 1 \\ 0 & b & 1 \\ d & b & 1 \end{bmatrix}^{-1} \begin{bmatrix} D_2 \\ D_3 \\ D_4 \end{bmatrix} = \begin{bmatrix} -D_3/d + D_4/d \\ -D_2/b + D_4/b \\ D_2 + D_3 - D_4 \end{bmatrix}.$$

Assuming that the point $(0, 0, D_1)$ is on the same plane, we have:

$$D_1 = \rho_1 = -D_2 + D_3 - D_4 \rightarrow D_1 - D_2 - D_3 + D_4 = 0. \qquad \text{Equation LXXII}$$

Now, we can develop a real-time estimator to estimate piston position and the disturbances in real-time. The extended Kalman filter (EKF) was used for this purpose. The state to be estimated is:

$$X = [x_p\ v_p\ a_p\ D_1\ D_2\ D_3\ D_4]. \qquad \text{Equation LXXIII}$$

where: $v_p$, $a_p$ are piston velocity and acceleration, respectively.

The time update equations are:

$$X_k = FX_{k-1} + w_{k-1}, w_k \sim (0, Q_k) \qquad \text{Equation LXXIV}$$

$$\hat{X}_k^- = F\hat{X}_{k-1}^+, P_k^- = FP_{k-1}^+ F^T + Q_{k-1}$$

$$F = \begin{bmatrix} 1 & dt & 0 & 0 & 0 & 0 & 0 \\ 0 & 1 & dt & 0 & 0 & 0 & 0 \\ 0 & 0 & 1 & 0 & 0 & 0 & 0 \\ 0 & 0 & 0 & 1 & 0 & 0 & 0 \\ 0 & 0 & 0 & 0 & 1 & 0 & 0 \\ 0 & 0 & 0 & 0 & 0 & 1 & 0 \\ 0 & 0 & 0 & 0 & 0 & 0 & 1 \end{bmatrix}.$$

The measurement update equations are:

$$Z = h(X, n), Z = [B1_x \ B2_x \ B3_x \ B4_x \ 0]^T,$$ Equation LXXV $$h(X, n) = [f_1(x_p) + D_1 + n_1 \ f_2(x_p) + D_2 +$$

$$n_2 \ \ldots \ \ldots \ f_3(x_p) + D_3 + n_3 \ f_4(x_p) + D_4 + n_4 \ \ldots$$

$$\ldots D_1 - D_2 - D_3 + D_4 + n_5]^T, n \sim (0, R)$$

$$R = diag([\sigma_B \ \sigma_B \ \sigma_B \ \sigma_B \ \sigma_{const}]),$$

$$H_k = \frac{\partial h}{\partial X}\bigg|_{\hat{X}_k^-}, K_k = P_k^- H_k^T (H_k P_k^- H_k^T + R_k)^{-1},$$

$$r_k = Z_k - h_k(\hat{X}_k^-, 0),$$

$$\hat{X}_k^+ = \hat{X}_k^- + K_k r_k, P_k^+ = (I - K_k H_k) P_k^-.$$

Note that the imposed constraint on the disturbances $D_i$'s is included as a perfect measurement. Since at the beginning of each test, the initial magnetic field is subtracted from the sensors' readings, the estimator starts with zero disturbance. Therefore, the model uncertainty associated with disturbances, $Q_{i,i}$ (i=4,5,6,7), is set to zero. The measurement residual $r_k$ is small in this case. However, as soon as an external magnetic object creates a disturbance on the sensors readings, $r_k$ will increase and when it goes over a preset threshold, $Q_{i,i}$ (i=4,5,6,7) will be set to be nonzero to allow for the estimation of the disturbances $D_i$'s.

Figure 32:
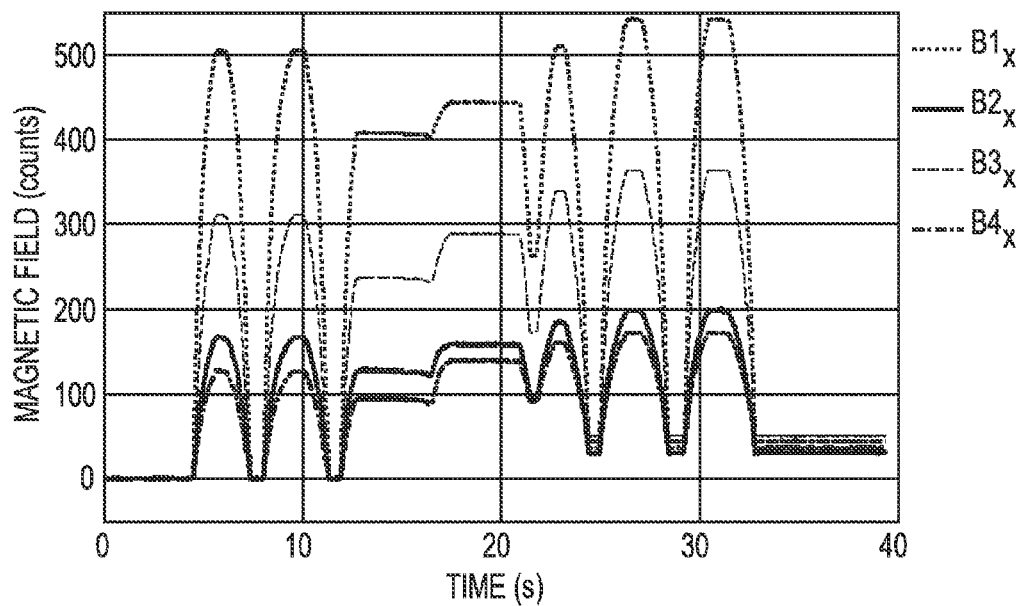
FIG. 32 shows magnetic field readings of four magnetic sensors that get affected by an external disturbance.
Figure 33:
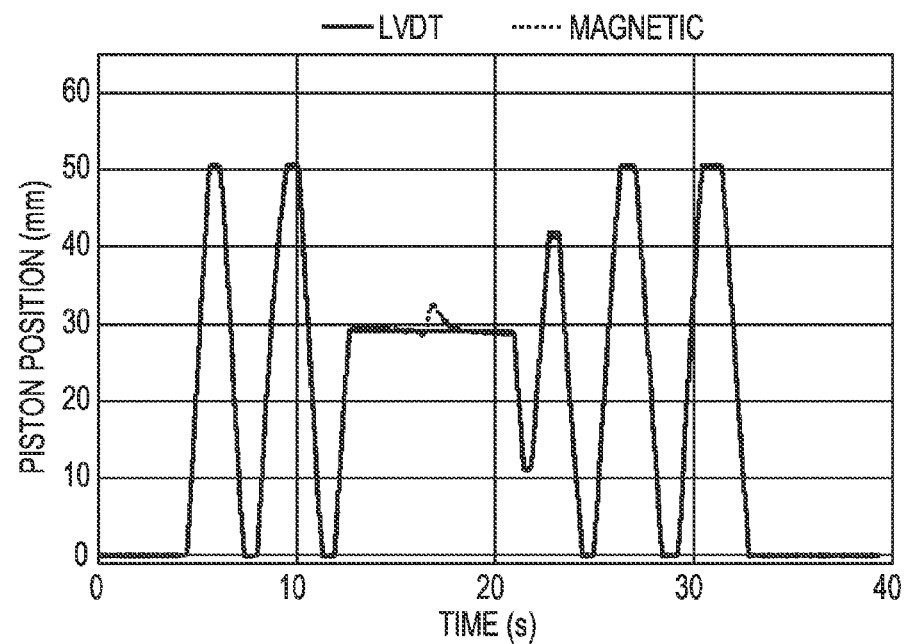
FIG. 33 shows piston position measured by LVDT and estimated from magnetic sensor measurements.
Figure 34:
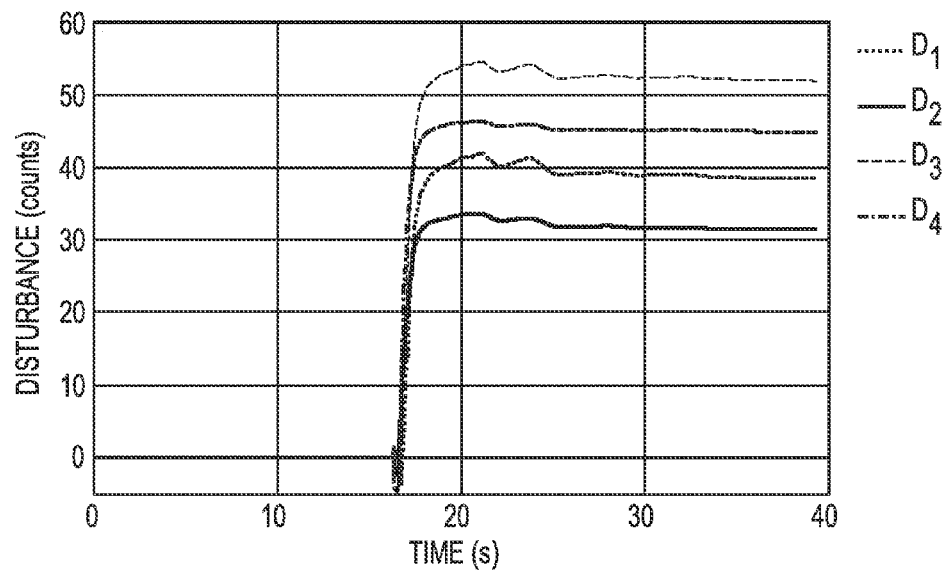
FIG. 34 shows estimated disturbance on each of four magnetic sensors over time.

The disturbance rejection algorithm described above was verified against several tests including the one shown in FIG. 29. The measurements from the four sensors are shown in FIG. 32, which shows how the external disturbance affects the sensors readings at t=16 s. FIG. 33 shows piston position measured by LVDT and estimated from the magnetic sensors over time. It can be seen that the estimated position momentarily deviates from the actual position after the disturbance affects the sensors but converges to the actual value after a short period of time. FIG. 34 shows the disturbance estimation over time.

Figure 35:
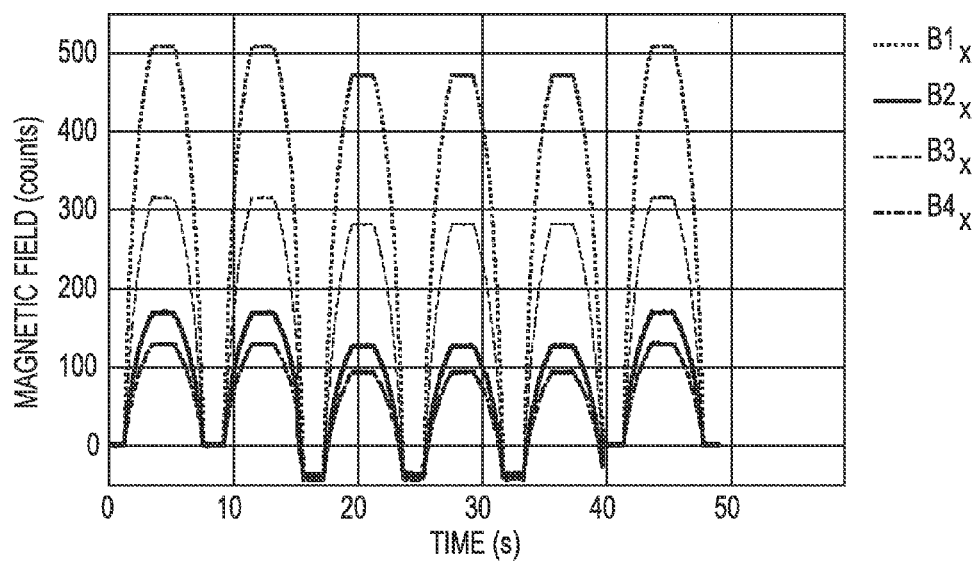
FIG. 35 shows the measured magnetic field readings from four sensors.
Figure 36:
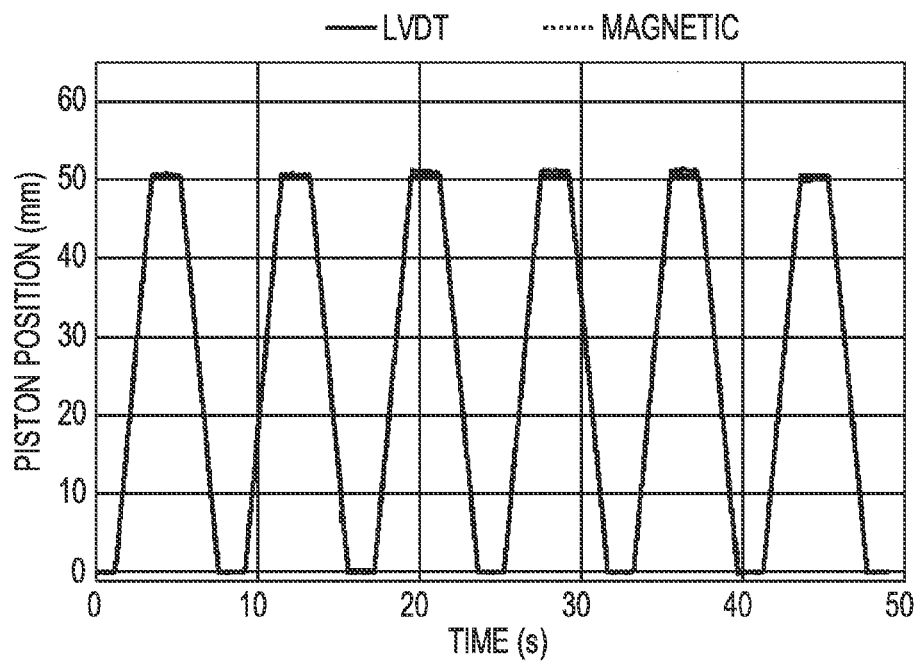
FIG. 36 shows piston position measured by LVDT and estimated from magnetic sensors measurements.
Figure 37:
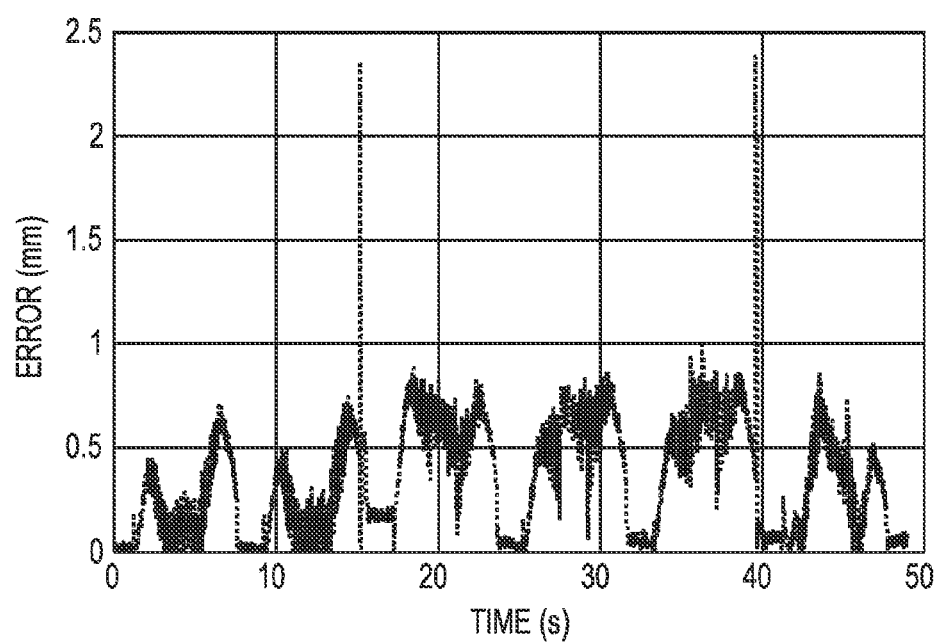
FIG. 37 shows error in position estimation over time.
Figure 38:
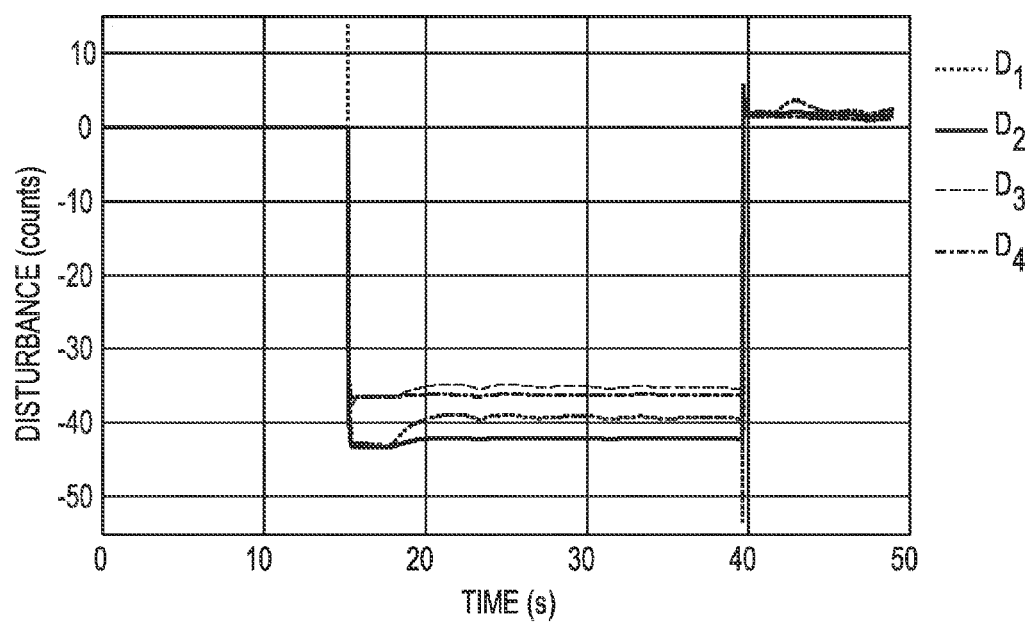
FIG. 38 shows an estimated disturbance on magnetic sensors.

In order to investigate how fast the sensing system recovers from an external disturbance, another experiment was conducted. A coil was placed next to the sensors and a step current was sent through the wirings to create a step magnetic field disturbance on the sensors. The step disturbances have a 10%-90% rise time of 25 ms. FIG. 35 shows the measured magnetic field from the four sensors. A step current is sent through the coil at t≅15 s and removed at t≅40 s. FIG. 36 shows piston position measured by LVDT and estimated from the magnetic sensors. The error in position estimation is shown in FIG. 37. It can be seen that due to the generation and removal of the external disturbance, the error increases at t≅15 s and t≅40 s but drops very quickly (within 65 ms) below 1 mm. FIG. 38 shows the estimated disturbance on each sensor.

In general, the time it takes for the estimated disturbances to converge to the actual disturbances determines how fast the sensing system can recover from an external disturbance. This time depends on several factors including the motion of the piston. The key factors in estimation of the disturbances on each sensor are the usage of the magnetic field model of the piston and the assumed constraint between the disturbances expressed by Equation LXXII. Hence, when an external object disturbs the sensors signals, if the piston is moving, more data points would be obtained and convergence time would be faster compared to the case when the piston is stationary.

The disturbance rejection algorithm described above can be generalized and be used with a different number and configuration of sensors. The following provides a summary of the disturbance rejection method as a guideline.

As a first step, a desired number of sensors N≥2 is placed close to the object which its position is to be estimated. In the ideal case with no disturbance on the sensors, we have:

$$Bi = f_i(x_p, \lambda) \ i=1,2,\ldots,N,$$ Equation LXXVI where: $x_p$ is the piston position, $\lambda$ is a vector of parameters in the magnetic field model, and B is the measured magnetic field.

A second step is to identify the model parameters, $\lambda_i$'s, using the method described above.

As a third step, in general, the sensors measurement equations can be written as:

$$Bi = f_i(x_p, \lambda) + D_i \ i=1,2,\ldots,N,$$ Equation LXXVII where: $D_i$'s model the disturbance on each sensor caused by an external object.

The geometry and the location of the sensors is used to impose an M≥1 constraint on the disturbances as:

$$c_j(D) = 0 \ i=1,2,\ldots,M.$$ Equation LXXVIII

Equation LXXII is an example of such constraints. Two other examples are provided below.

A fourth step is to develop an estimator (such as EKF) using the measurement equations and the constraints to estimate both the position and disturbances. Note that the number of sensors N and the arrangement of the sensors depend on the specific application and the type of disturbances expected to occur. As an example, consider piston position measurement in a mobile vehicle using the proposed method where disturbances occur due to the motion and rotation of the vehicle in the Earth magnetic field. In this case, if the sensors are close to each other, we can assume that they are affected uniformly by the Earth magnetic field. Hence, we can write the constraint on the disturbances simply as:

$$c(D) = D_1 - D_2 = 0.$$ Equation LXXIX

As another example, for the sensor configuration discussed above, if we also measure the magnetic field along the Y-axis of the sensors, we will have two sets of constraints:

$$\begin{cases} c_1(D_x) = D_{x1} - D_{x2} - D_{x3} + D_{x4} = 0 \\ c_2(D_y) = D_{y1} - D_{y2} - D_{y3} + D_{y4} = 0 \end{cases}$$ Equation LXXX where: $D_{xi}$'s and $D_{yi}$'s are the disturbances on each sensor's X-axis and Y-axis measurements. Similarly, we can apply a constraint on the magnitude of the disturbances as:

$$c(D) = (D_{x1}^2 + D_{y1}^2)^{0.5} - (D_{x2}^2 + D_{y2}^2)^{0.5} -$$ Equation LXXXI $$(D_{x3}^2 + D_{y3}^2)^{0.5} + (D_{x4}^2 + D_{y4}^2)^{0.5} = 0.$$

Figure 39:
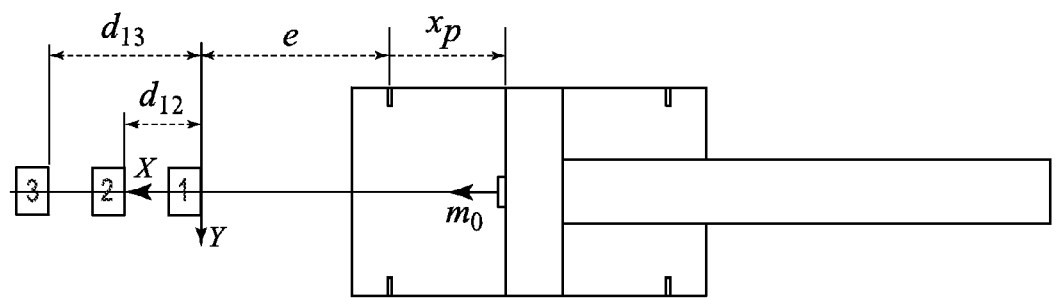
FIG. 39 shows a sensor configuration for disturbance rejection using three longitudinally spaced sensors.
Figure 40:
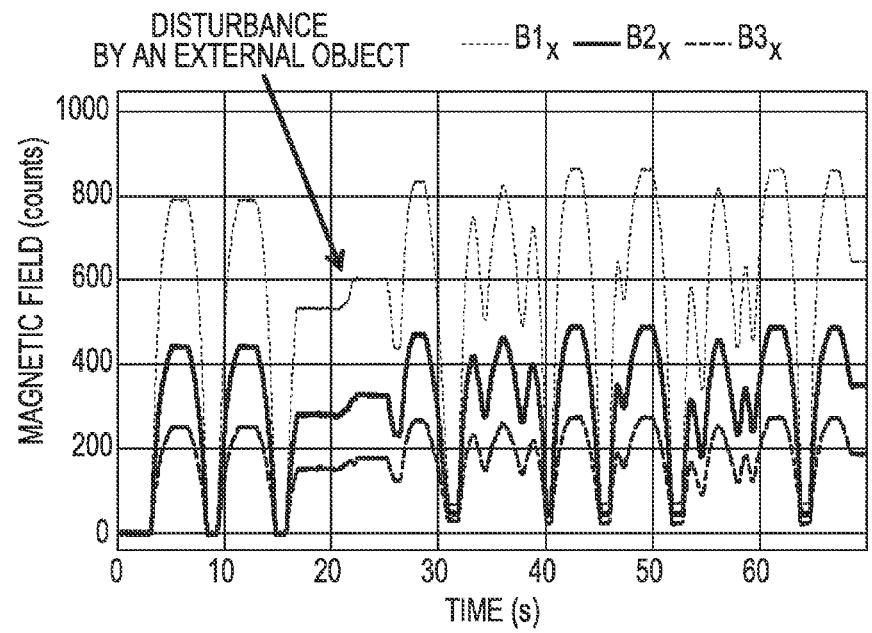
FIG. 40 shows magnetic field readings of the sensors with a disturbance caused by an external object.
Figure 41:
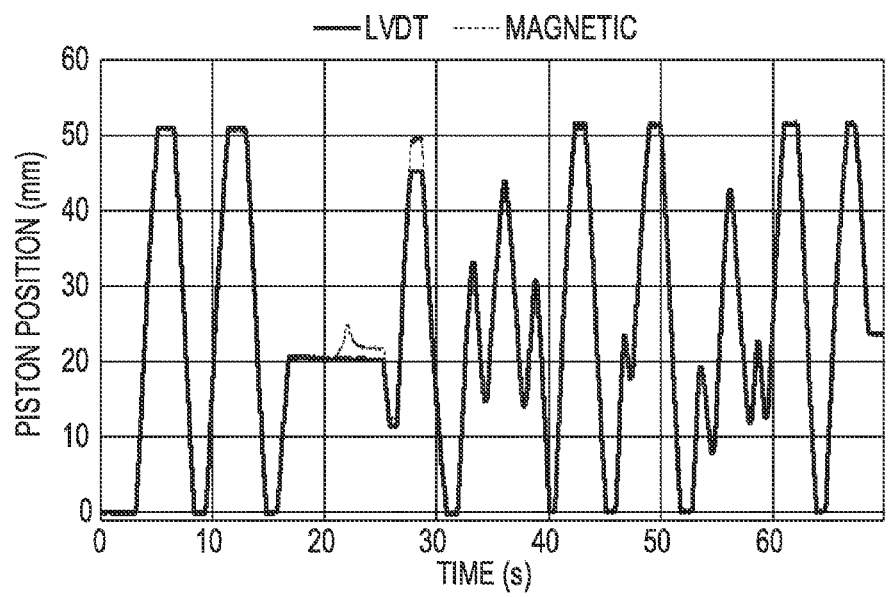
FIG. 41 shows piston position measured by LVDT and estimated from the magnetic sensors measurements.

In the following, another example for the disturbance rejection method is described and involves piston position measurement with three longitudinally spaced sensors. In this example of the disturbance rejection algorithm, three magnetic sensors are placed longitudinally along the axis of the motion of the pneumatic cylinder as shown in FIG. 39.

Following the steps described above, we write the measurement equations as:

$$\begin{cases} B1_{xf} = \dfrac{p}{(x_{pf}+e)^3} - \dfrac{p}{(x_{p0}+e)^3} \\ B2_{xf} = \dfrac{p}{(x_{pf}+e+d_{12})^3} - \dfrac{p}{(x_{p0}+e+d_{12})^3} \\ B3_{xf} = \dfrac{p}{(x_{pf}+e+d_{13})^3} - \dfrac{p}{(x_{p0}+e+d_{13})^3} \end{cases} \quad \text{Equation LXXXII}$$

where: $d_{12}$ is the distance between sensors "1" and "2", and $d_{13}$ is the distance between sensors "1" and "3". Next, we apply the method described above to identify model parameters. As a constraint on the disturbances, we assume that we can fit a line to the disturbances on the sensors. A line in 2-D plane can be expressed as:

$$y = \rho_1 x + \rho_2, \quad \text{Equation LXXXIII}$$

where: $\rho_i$'s are line parameters.

Considering a line in a 2-D plane passing through the two points $(d_{12}, D_2)$ and $(d_{13}, D_3)$ we have:

$$\begin{cases} D_2 = \rho_1 d_{12} + \rho_2 \\ D_3 = \rho_1 d_{13} + \rho_2 \end{cases} \Rightarrow \quad \text{Equation LXXXIV}$$

$$\begin{cases} \rho_1 = (D_3 - D_2)/(d_{13} - d_{12}) \\ \rho_2 = (D_2 d_{13} - D_3 d_{12})/(d_{13} - d_{12}) \end{cases}$$

Assuming that the point $(0, D_1)$ is on the same line and $d_{13} = 2d_{12}$, we have:

$$c(D) = D_1 - 2D_2 + D_3 = 0 \quad \text{Equation LXXXV}$$

Figure 42:
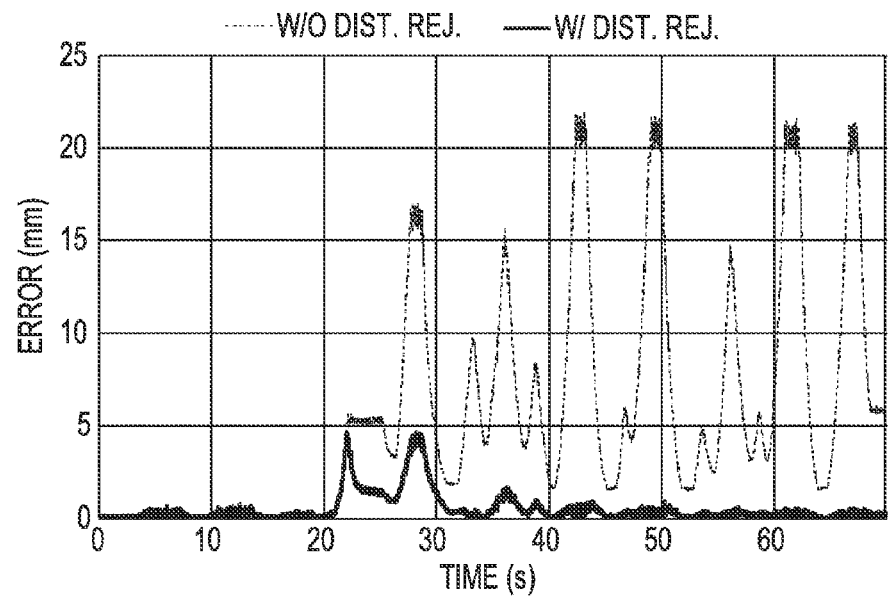
FIG. 42 shows an error in position estimation with and without disturbance rejection.
Figure 43:
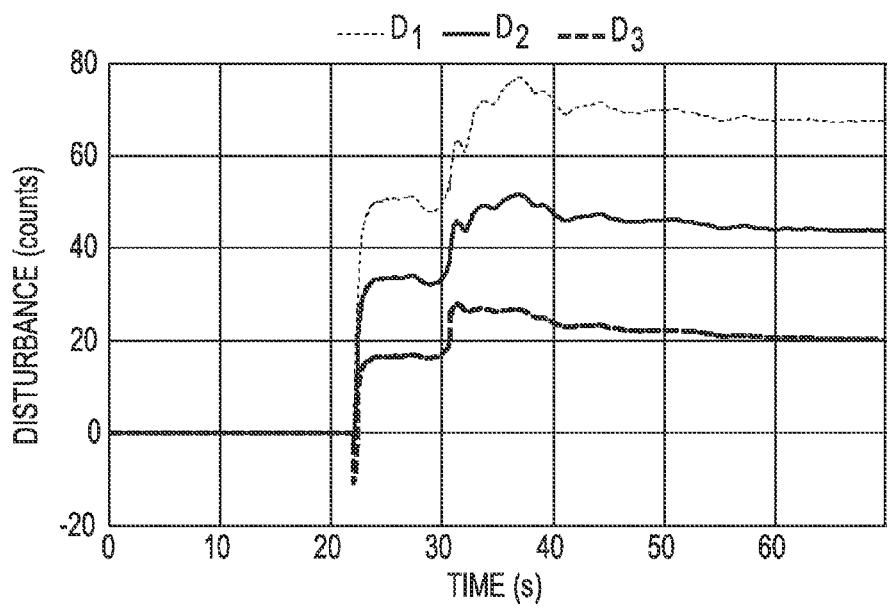
FIG. 43 shows an estimated disturbance on each of the sensors.

Finally, we use the EKF to estimate both piston position as well as the disturbances on the sensors. FIGS. 40-43 show the experimental results from this sensing system where an external disturbance was created by placing a wrench close to the sensors. As seen from FIG. 41 and FIG. 43, the disturbance is partially estimated and corrected for as it is caused by the wrench. However, as the piston starts its motion, the estimated disturbances converge to the true disturbances and the estimation error reduces. Also, FIG. 42 shows that the disturbance rejection algorithm provides a great advantage compared to a sensing system without disturbance rejection where errors of up to 20 mm are observed.

As described above, a method for measuring piston position was developed using a small embedded magnet on the piston head. A nonlinear model of the magnetic field as a function of position was exploited together with auto-calibration algorithms to create a robust and accurate position measurement system. It has been shown that sub-millimeter accuracy can be achieved with the proposed position measurement system.

A challenge in using magnetic sensors for position estimation is the effect of external disturbances caused by objects moving close to the sensors. A method was disclosed to estimate and reject the external disturbance and it has been verified through experiments. This method can also be applied to other sensing systems, not necessarily magnetic based, which are affected by external disturbances.

The disturbance rejection works by taking measurements from four sensors placed in the corners of a square and assuming that it is possible to fit a plane to the disturbance caused to the four sensors. In another embodiment, three sensors are placed longitudinally and a line is fit to the disturbances on the sensors. In one form of this embodiment, a closer spacing between the sensors may be used.

In the disturbance rejection method according to one embodiment, only the measurements along the X-axis of the sensors are used. Other embodiments may include the measurements along the Y-axis as well for a higher resilience to external disturbances. The constraints that the piston position cannot decrease below zero and increase over the stroke length may also be used as constraints in the estimator.

Two-Dimensional Position Estimation: The position measurement system described herein can be extended to measurement in two-dimensions and three-dimensions. By using multi-axis magnetic field sensors and by using a matrix of sensors placed along two orthogonal axes, having both lateral and longitudinal separation of known distances, two-dimensional motion of a ferromagnetic object can be determined. The properties of auto-calibration and adaptive estimation to automatically find parameters of the magnetic field function can also be used in two-dimensional and three-dimensional applications.

An example of a ferromagnetic object that has two-dimensional motion is a car that has both lateral and longitudinal motion. The two-dimensional motion of a car can be determined by using a two-dimensional matrix of magnetic sensors with known lateral and longitudinal separations and the procedure described in this disclosure. Such a sensor system would be useful, for instance, in a car to detect the two-dimensional position of another car in close proximity to the first car.

One embodiment is directed to a position sensing system for measuring a position of a moving object. The system includes a first magnetic sensor configured to measure an intensity of a magnetic field produced by the moving object. The system includes a controller configured to estimate a position of the moving object based on a nonlinear model of the magnetic field produced by the moving object as a function of position around the moving object, and based on the measured intensity of the magnetic field produced by the moving object.

In one form of this embodiment, the nonlinear model varies based on a shape of the moving object and a strength of magnetization of the moving object. The controller is configured to subtract an initially measured magnetic field from the measured intensity of the magnetic field produced by the moving object to remove the influence of static or slowly varying magnetic fields. The first magnetic sensor is in a fixed position and does not move with the moving object. The first magnetic sensor is aligned with an axis of movement of the moving object. The controller is configured to provide a real-time indication of a current position of the moving object.

In one embodiment, the system includes a second magnetic sensor configured to measure the intensity of the magnetic field produced by the moving object, and the controller is configured to estimate the position of the moving object based on the measured intensity from the first and second magnetic sensors. In one form of this embodiment, the controller is configured to adaptively estimate parameters of the nonlinear model using magnetic field measurements from the first and second magnetic sensors. In another form of this embodiment, the controller is configured to use an iterated least squares method to adaptively estimate the parameters. In yet another form of this embodiment, the controller is configured to use a method that minimizes a maximum error to adaptively estimate the parameters. In one embodiment, the controller is configured to adaptively estimate the parameters based on a known distance between the first and second magnetic sensors and a known minimum and maximum distance of the moving object from the first and second magnetic sensors. In one embodiment, the controller is configured to use an Extended Kalman Filter (EKF) to adaptively estimate the parameters. The controller is configured to periodically update the parameters of the nonlinear model during operation of the system.

In one embodiment, the system includes a plurality of magnetic sensors, which include the first magnetic sensor, configured to measure the intensity of the magnetic field produced by the moving object, and the controller is configured to automatically compensate for unexpected magnetic field disturbances in the measured intensity of the magnetic field. In one form of this embodiment, the controller is configured to impose at least one constraint on the disturbances based on a geometry and location of the plurality of magnetic sensors, and the controller is configured to use the nonlinear model and the at least one constraint to estimate the disturbances.

Another embodiment is directed to a method of measuring a position of a moving object. The method includes measuring an intensity of a magnetic field produced by the moving object with at least one magnetic sensor, and estimating a position of the moving object based on a nonlinear model of the magnetic field produced by the moving object as a function of position around the moving object, and based on the measured intensity of the magnetic field produced by the moving object.

In one form of this embodiment, the nonlinear model varies based on a shape of the moving object and a strength of magnetization of the moving object. In one embodiment, the method further includes adaptively estimating parameters of the nonlinear model using magnetic field measurements from the at least one magnetic sensor. In another embodiment, the method further includes automatically compensating for unexpected magnetic field disturbances in the measured intensity of the magnetic field based on a geometry and location of the at least one magnetic sensor.

Yet another embodiment is directed to a position sensing system for measuring a position of a moving object. The system includes a plurality of magnetic sensors configured to perform magnetic field measurements of a magnetic field produced by the moving object. The system includes a controller configured to adaptively estimate parameters of a nonlinear model of the magnetic field produced by the moving object as a function of position around the moving object using the magnetic field measurements, and estimate a position of the moving object based on the nonlinear model and the magnetic field measurements.

VIII. Conclusion

One embodiment is directed to a sensor for the non-intrusive real-time measurement of piston position inside a cylinder. The sensor according to one embodiment utilizes external magnetic field measurements and does not require sensor placements inside the cylinder. By modeling the magnetic characteristics of the piston, a model of the magnetic field as a function of longitudinal position was obtained. Using magnetic field sensors, the piston position is obtained from the magnetic field measurements. Although some embodiments are described in the context of one dimensional position sensing, it will be understood that the techniques described herein may also be applied to two-dimensional or three-dimensional position sensing.

A challenge arises from the fact that the parameters of the model would vary from engine to engine and would be cumbersome to calibrate for each engine. This challenge is addressed in one embodiment by utilizing two magnetic field sensors with known longitudinal separation between them. By using a redundant magnetic sensor, the need to calibrate and to use an additional position sensor (such as an LVDT) for calibration was eliminated. A number of estimation methods were described, which identify and update magnetic field parameters in real-time without requiring an additional LVDT sensor for calibration. Experimental results from a free piston engine test configuration showed that the sensor can provide better than 0.4 mm accuracy in position estimates. The sensing system can be utilized for piston position measurement in multi-cylinder SI and diesel engines, hydraulic cylinders and in many other position measurement applications.

Unlike other systems that utilize magnets to detect whether a particular position is being crossed (i.e., position "detection" rather than position "measurement"), the embodiments disclosed herein include a method to continuously measure position during motion. Second, no external magnets are required—the inherent magnetic field of the ferromagnetic object is used. Third, the system auto-calibrates adaptively using the redundant magnetic sensors in the matrix of sensors.

Potentiometers, linear variable differential transformers (LVDTs), lasers, and LED based systems may be used for position measurement. In general, the LVDT and potentiometer type of sensors require a mechanical connection between the moving object and the sensor. Hence, it is not possible to use these sensors in a case where the moving object is isolated, such as a piston moving inside the engine. Making the mechanical connection requires modification of the design of the system, requires assembly, and can expose the sensors to a harsh environment where their performance reduces. Another limitation of these types of sensors is that the size of the sensor increases as the range of measurement increases.

Embodiments disclosed herein are less expensive than a potentiometer, which is the least expensive of the sensor systems listed above. Embodiments disclosed herein are also non-contacting, less noisy, and much more accurate than a potentiometer. Compared to the LVDT, embodiments disclosed herein have the advantage of being non-contacting and being an external sensor. An LVDT would have to be installed between a moving piston and a non-moving reference to provide measurements. Installing an LVDT inside a piston cylinder would be highly time-consuming Embodiments disclosed herein can measure piston position without requiring installation inside the cylinder.

Laser and LED sensors do not require mechanical connection. However, they require a clear line of sight to the moving object. Hence, their application becomes limited in cases where the moving object is isolated. Another requirement of the sensor is that the surface of the moving object should reflect a certain percentage of the laser beam. Compared to the laser and LED based position measurement systems, embodiments disclosed herein are an order of magnitude cheaper. Laser and LEDs that provide sub-mm level accuracy are highly expensive. Embodiments disclosed herein do not require a clear line of sight to the moving object and are not dependent on the reflective properties of the moving object.

Some position measurement systems that are based on magnetic fields only provide a binary measurement of position (e.g., an indication of whether the piston is to the left or the right of the sensor), and do not provide a continuous measurement of position like embodiments disclosed herein. The inherent magnetic fields of ferromagnetic objects have been exploited for binary sensing (detection) of objects. For example, magnetic sensors embedded in highway lanes have been used to detect passing cars and to count the number of cars that travel over a sensor. Likewise, such sensors have also been used to detect the presence of a parked car in a parking spot. Note that both of the above applications only detect the presence of a vehicle and do not measure the distance to the vehicle from the sensor.

Some position measurement systems that are based on magnetic fields require installation of an extra magnet on the moving object, and an array of AMR devices is placed adjacent to the moving object. In such a system, the required short gap (i.e., 0.5 mm to 5.5 mm) between the sensor and the moving object limits the applicability of the sensor in cases where a thicker isolation of the moving object is required. Another major drawback of such a system is that the size of the sensor increases with the increase in the range of measurement of the sensor. For example, if it is desired to measure the position of a hydraulic piston whose range of motion is 500 mm, the length of the sensor should be at least 500 mm. The accuracy of magnetic sensors can be adversely affected by external magnetic objects coming close to the sensors.

In some systems, the size of the magnets attached to the moving object are different based on the desired range of motion, and can be as large as 20 mm in diameter and 7 mm in thickness, limiting the placement of magnets in a moving piston in an engine or a hydraulic cylinder. Some of these systems also have poor linearity. In contrast, embodiments disclosed herein do not have these drawbacks. Embodiments disclosed herein do not scale with the displacement being measured. Even with a small sensor footprint, embodiments disclosed herein can measure large displacements (e.g., 3 meters or more). Specific embodiments provide a 1% linearity across a 3 meter range.

Hall-effect and eddy current sensors are used in the modern industrial world for distance measurement and utilize either permanent magnets or electromagnets for their operation. They are only able to measure position at very small distances (typically less than 1 cm) between the magnet and the sensor. Embodiments of the position measurement system disclosed herein differ fundamentally from both of the above sensors because it seeks to exploit the inherent magnetic fields of ferromagnetic objects, without requiring the use of any electromagnets or permanent magnets. Neither line of sight nor close proximity between sensor and object are required for this measurement system. The position measurement system can work at distances that are two orders of magnitude larger. Since no permanent magnet or electromagnet is required, no installation is required inside the object whose position needs to be measured.

Since embodiments disclosed herein use a nonlinear model of the magnetic field of the object, the embodiments can function over a very large range and the sensors do not need to be very close to the object being measured. The range achieved by embodiments disclosed herein exceeds the range achieved by prior sensors. Another advantage provided by embodiments disclosed herein is the adaptive auto-calibration based on the magnetic function model. This provides robust performance in the presence of external magnetic fields as well as in the presence of inaccurate or unknown magnetic parameters of the individual ferromagnetic object. In one embodiment, the system is configured to perform temporal filtering to remove changes in the measured magnetic field due to outside interference (e.g., introduction of a nearby ferrous object).

Although the present invention has been described with reference to preferred embodiments, workers skilled in the art will recognize that changes can be made in form and detail without departing from the spirit and scope of the present invention.

What is claimed is:

1. A position sensing system for measuring a linear position of a linearly moving object, comprising:
   first and second magnetic sensors located near the moving object and configured to measure an intensity of a magnetic field produced by the moving object, wherein the first magnetic sensor is located at a known distance from the second magnetic sensor;
   a memory storing a nonlinear model of the magnetic field produced by the moving object as a function of position around the moving object; and
   a controller with an auto-calibration system configured to use an expected relationship between signals of the first and second magnetic sensors to automatically calibrate parameters of the nonlinear model and compute the linear position of the linearly moving object.

2. The position sensing system of claim 1, wherein the nonlinear model varies based on a shape of the moving object and a strength of magnetization of the moving object.

3. The position sensing system of claim 1, wherein the controller is configured to subtract an initially measured magnetic field from the measured intensity of the magnetic field produced by the moving object to remove an influence of static or slowly varying magnetic fields.

4. The position sensing system of claim 1, wherein the first and second magnetic sensors are in a fixed position and do not move with the moving object.

5. The position sensing system of claim 4, wherein the first and second magnetic sensors are aligned with an axis of linear movement of the moving object.

6. The position sensing system of claim 1, wherein the controller is configured to provide a real-time indication of a current position of the moving object.

7. The position sensing system of claim 1, and further comprising:
   at least one additional magnetic sensor configured to measure an intensity of the magnetic field produced by the moving object, wherein the at least one additional magnetic sensor is located at a fixed distance from the first and second magnetic sensors, and wherein the controller with the auto-calibration system is configured to use an expected relationship between signals of the first and second magnetic sensors and the at least one additional magnetic sensor to automatically calibrate parameters of the nonlinear model and compute the position of the moving object.

8. The position sensing system of claim 1, wherein the controller is configured to adaptively estimate the parameters of the nonlinear model using magnetic field measurements from the first and second magnetic sensors.

9. The position sensing system of claim 8, wherein the controller is configured to adaptively estimate the parameters based on the known distance between the first and second magnetic sensors and a known minimum and maximum distance of the moving object from the first and second magnetic sensors.

10. The position sensing system of claim 8, wherein the controller is configured to use one of a deterministic nonlinear observer and a stochastic filter to adaptively estimate parameters of the nonlinear model.

11. The position sensing system of claim 8, wherein the controller is configured to periodically update the parameters of the nonlinear model during operation of the system.

12. The position sensing system of claim 8, wherein the controller is configured to use an iterated least squares method to adaptively estimate parameters of the nonlinear model.

13. The position sensing system of claim 8, wherein the controller is configured to automatically compensate for unexpected magnetic field disturbances in the measured intensity of the magnetic field produced by the moving object.

14. The position sensing system of claim 13, wherein the controller is configured to impose at least one constraint on disturbance components read by the magnetic sensors based on a geometry and location of the magnetic sensors, and wherein the controller is configured to use the nonlinear model and the at least one constraint to estimate the disturbances.

15. The position sensing system of claim 13, wherein additional magnetic sensors located at known distances from the first and second magnetic sensors are used to estimate and compensate for the unexpected magnetic field disturbances.

16. The position sensing system of claim 1, wherein the moving object comprises a piston with linear motion inside a cylinder, and wherein the first and second magnetic sensors are positioned outside the cylinder.

17. The position sensing system of claim 1, wherein the moving object comprises a rotating object inside a machine, and wherein the first and second magnetic sensors are positioned on a static portion of the machine outside the rotating object.

18. A method of measuring a linear position of a linearly moving object, comprising:
  measuring an intensity of a magnetic field produced by the linearly moving object with at least one magnetic sensor located near the linearly moving object;
  estimating, with a controller, a linear position of the linearly moving object based on a nonlinear model of the magnetic field produced by the linearly moving object as a function of position around the linearly moving object, and based on the measured intensity of the magnetic field produced by the linearly moving object; and
  automatically compensating, with the controller, for unexpected magnetic field disturbances in the measured intensity of the magnetic field based on a geometry and location of the at least one magnetic sensor.

19. The method of claim 18, wherein the nonlinear model varies based on a shape of the moving object and a strength of magnetization of the moving object.

20. The method of claim 18, and further comprising:
  adaptively estimating parameters of the nonlinear model using magnetic field measurements from the at least one magnetic sensor.

21. A position sensing system for measuring a linear position of a piston moving linearly within a cylinder, comprising:
  a plurality of magnetic sensors positioned outside of the cylinder and configured to perform magnetic field measurements of a magnetic field produced by at least one of the piston and a piston rod attached to the piston; and
  a controller communicatively coupled to the plurality of magnetic sensors and configured to adaptively estimate parameters of a nonlinear model of the magnetic field as a function of position around the piston using the magnetic field measurements and a known distance between the magnetic sensors, and estimate a linear position of the piston based on the nonlinear model and the magnetic field measurements.

22. The position sensing system of claim 21, wherein the controller is configured to automatically compensate for unexpected magnetic field disturbances in the magnetic field measurements based on a geometry and location of the magnetic sensors.

* * * * *